United States Patent
Kuwata et al.

(10) Patent No.: US 8,337,024 B2
(45) Date of Patent: Dec. 25, 2012

(54) PROJECTION OPTICAL SYSTEM AND IMAGE DISPLAY APPARATUS

(75) Inventors: Muneharu Kuwata, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 12/725,633

(22) Filed: Mar. 17, 2010

(65) Prior Publication Data

US 2010/0238416 A1 Sep. 23, 2010

(30) Foreign Application Priority Data

Mar. 18, 2009 (JP) .................. 2009-065604
Jan. 27, 2010 (JP) .................. 2010-015620

(51) Int. Cl.
*G03B 21/28* (2006.01)
*G03B 21/14* (2006.01)
*G02B 17/00* (2006.01)
*G02B 9/00* (2006.01)
*G02B 9/08* (2006.01)

(52) U.S. Cl. ............. 353/77; 353/97; 359/728; 359/739

(58) Field of Classification Search ............... 353/77, 353/78, 98, 99, 102, 37, 97; 359/850, 857, 359/858, 727, 728, 733–736, 649–651, 726, 359/739–740, 691
See application file for complete search history.

(56) References Cited

U.S. PATENT DOCUMENTS

| 7,857,463 B2* | 12/2010 | Destain ........................ 353/77 |
| 7,911,704 B2* | 3/2011 | Takaura et al. ............... 359/649 |
| 2006/0126032 A1* | 6/2006 | Takaura et al. ................ 353/99 |

FOREIGN PATENT DOCUMENTS

| JP | 2007-94405 A | 4/2007 |
| JP | 2007-323047 A | 12/2007 |

* cited by examiner

*Primary Examiner* — William C Dowling
*Assistant Examiner* — Ryan Howard
(74) *Attorney, Agent, or Firm* — Birch, Stewart, Kolasch & Birch, LLP

(57) ABSTRACT

A projection optical system for enlarging and projecting a light flux from an image display panel modulating an irradiation light, onto a screen in an oblique direction, the projection optical system includes: a lens system including a plurality of lenses, the lens system refracting the light flux from the image display panel; a single convex mirror reflecting the light flux from the lens system, the lens system and the convex mirror being arranged in an order from the image display panel; and a stop disposed in an optical path after an emission from the lens system to an incidence on the convex mirror.

17 Claims, 34 Drawing Sheets

FIG. 24

| PROJECTION OPTICAL SYSTEM OF FIRST NUMERICAL EXAMPLE | | | | |
|---|---|---|---|---|
| si | Ri [mm] | Di [mm] | n | $\nu$ |
| s1 | Infinity | 1.10 | | |
| s2 | Infinity | 1.05 | 1.50690 | 63.1 |
| s3 | Infinity | 3.00 | 1.51680 | 64.2 |
| s4 | Infinity | 33.00 | | |
| s5 (STOP) | Infinity | 1.00 | | |
| s6 | -107.871 | 3.09 | 1.80518 | 25.5 |
| s7 | -26.411 | 0.20 | | |
| s8 | -763.176 | 4.56 | 1.77905 | 47.6 |
| s9 | -17.325 | 2.00 | 1.76020 | 32.3 |
| s10 | -33.235 | 2.19 | | |
| s11 | -19.228 | 2.00 | 1.68624 | 32.4 |
| s12 | 34.181 | 7.38 | 1.67780 | 53.4 |
| s13 | -22.109 | 0.20 | | |
| s14 | 510.177 | 2.00 | 1.76496 | 27.3 |
| s15 | 18.685 | 7.20 | 1.76692 | 48.1 |
| s16 | -80.035 | 3.22 | | |
| s17 | -23.997 | 10.98 | 1.80518 | 25.5 |
| s18 | -20.970 | 2.00 | 1.58612 | 39.0 |
| s19 | 37.963 | 8.48 | | |
| s20 | -26.993 | 7.12 | 1.54575 | 54.0 |
| s21 | 73.808 | 12.54 | 1.80518 | 25.5 |
| s22 | -49.001 | 41.35 | | |
| s23 | 64.877 | 21.62 | 1.80420 | 46.5 |
| s24 | -101.084 | 2.00 | 1.62942 | 34.4 |
| s25 | 191.908 | 3.98 | | |
| s26 | 52.856 | 20.76 | 1.78915 | 47.1 |
| s27 | -52.969 | 2.45 | 1.80518 | 25.5 |
| s28 | 51.134 | 11.42 | | |
| s29 | -44.396 | 2.00 | 1.80518 | 25.5 |
| s30 | 40.437 | 13.29 | 1.78204 | 47.4 |
| s31 | 171.553 | 23.38 | | |
| s32 | -147.990 | 2.00 | 1.80420 | 46.5 |
| s33 | 77.523 | 22.86 | 1.80518 | 25.5 |
| s34 | -63.473 | 0.20 | | |
| s35 | -196.949 | 2.00 | 1.80441 | 39.5 |
| s36 | 58.468 | 26.19 | 1.80518 | 25.5 |
| s37 | -97.606 | 6.36 | | |
| s38 | 113.162 | 22.10 | 1.49700 | 81.6 |
| s39 | -53.059 | 2.00 | 1.77888 | 26.3 |
| s40 | 67.779 | 0.20 | | |
| s41 | 63.457 | 28.34 | 1.51030 | 77.6 |
| s42 | -54.534 | 2.00 | 1.72669 | 28.3 |
| s43 | -93.052 | 0.20 | | |
| s44 | 63.719 | 12.94 | 1.75808 | 48.6 |
| s45 | 690.851 | 0.20 | | |
| *s46 | 33.510 | 5.00 | 1.52996 | 55.8 |
| *s47 | 41.542 | 41.38 | | |
| s48 | Infinity | 76.71 | | |
| s49 | Infinity | -74.00 | MIRROR | |
| *s50 | -23.184 | 99.00 | MIRROR | |
| s51 | Infinity | | | |

FIG. 25

| | s46 | s47 | s50 |
|---|---|---|---|
| \multicolumn{4}{c}{PROJECTION OPTICAL SYSTEM OF FIRST NUMERICAL EXAMPLE} |
| K | −1.702044E+00 | 5.173781E−02 | −3.483050E+00 |
| A1 | 0.000000E+00 | 0.000000E+00 | −4.406531E−02 |
| A2 | 0.000000E+00 | 0.000000E+00 | 4.411954E−04 |
| A3 | 0.000000E+00 | 0.000000E+00 | 2.062120E−06 |
| A4 | −5.141843E−06 | −5.709208E−06 | 8.661053E−09 |
| A5 | 0.000000E+00 | 0.000000E+00 | −9.329366E−11 |
| A6 | −8.189817E−10 | 2.796239E−10 | −5.706500E−13 |
| A7 | 0.000000E+00 | 0.000000E+00 | 6.157491E−16 |
| A8 | 2.340847E−13 | −2.818031E−12 | 2.292093E−17 |
| A9 | 0.000000E+00 | 0.000000E+00 | 1.777329E−19 |
| A10 | 2.372234E−17 | 9.121655E−16 | −1.422981E−21 |
| A11 | 0.000000E+00 | 0.000000E+00 | 1.578630E−23 |
| A12 | 0.000000E+00 | 0.000000E+00 | −1.147637E−25 |

FIG. 32

| PROJECTION OPTICAL SYSTEM OF SECOND NUMERICAL EXAMPLE | | | | |
|---|---|---|---|---|
| si | Ri [mm] | Di [mm] | n | $\nu$ |
| s1 | Infinity | 1.10 | | |
| s2 | Infinity | 1.05 | 1.50690 | 63.1 |
| s3 | Infinity | 3.00 | 1.51680 | 64.2 |
| s4 | Infinity | 33.00 | | |
| s5 | 45.956 | 7.85 | 1.80518 | 25.5 |
| s6 | −126.676 | 22.30 | | |
| s7 | −3422.210 | 3.20 | 1.80420 | 46.5 |
| s8 | −46.208 | 1.83 | | |
| s9 | −24.825 | 2.00 | 1.69020 | 30.1 |
| s10 | 14.635 | 6.50 | 1.68099 | 53.2 |
| s11 | −30.598 | 0.20 | | |
| s12 | 53.085 | 2.00 | 1.80501 | 27.7 |
| s13 | 12.091 | 4.98 | 1.63957 | 56.7 |
| s14 | −48.894 | 1.00 | | |
| s15 (STOP) | Infinity | 2.00 | | |
| s16 | −28.435 | 15.82 | 1.80518 | 25.5 |
| s17 | −15.774 | 8.00 | 1.49700 | 81.6 |
| s18 | 28.060 | 7.27 | | |
| s19 | −17.809 | 6.72 | 1.49700 | 81.6 |
| s20 | 77.123 | 7.79 | 1.80459 | 35.1 |
| s21 | −53.803 | 38.62 | | |
| s22 | 67.415 | 15.80 | 1.80420 | 46.5 |
| s23 | −210.968 | 0.20 | | |
| s24 | 44.554 | 20.95 | 1.75642 | 48.6 |
| s25 | −60.552 | 5.89 | 1.80518 | 25.5 |
| s26 | 40.400 | 10.06 | | |
| s27 | −42.755 | 4.73 | 1.80420 | 46.5 |
| s28 | −28.148 | 3.98 | 1.80518 | 25.5 |
| s29 | 60.294 | 20.00 | | |
| s30 | Infinity | 5.00 | | |
| s31 | −78.119 | 3.58 | 1.80420 | 46.5 |
| s32 | 255.863 | 17.87 | 1.80518 | 25.5 |
| s33 | −51.439 | 0.20 | | |
| s34 | −298.330 | 2.00 | 1.80421 | 46.2 |
| s35 | 104.119 | 19.99 | 1.80518 | 25.5 |
| s36 | −78.623 | 3.35 | | |
| s37 | 74.902 | 24.06 | 1.50245 | 79.9 |
| s38 | −50.727 | 2.00 | 1.75721 | 27.1 |
| s39 | 55.847 | 0.20 | | |
| s40 | 51.490 | 27.95 | 1.50089 | 80.4 |
| s41 | −49.993 | 2.00 | 1.76705 | 26.7 |
| s42 | −234.107 | 0.20 | | |
| s43 | 55.891 | 16.71 | 1.73758 | 49.6 |
| s44 | −511.411 | 0.20 | | |
| *s45 | 18.698 | 5.00 | 1.52996 | 55.8 |
| *s46 | 20.924 | 30.34 | | |
| s47 | Infinity | 75.40 | | |
| s48 | Infinity | −76.00 | MIRROR | |
| *s49 | −22.872 | 99.00 | MIRROR | |
| s50 | Infinity | | | |

FIG. 33

| | s45 | s46 | s49 |
|---|---|---|---|
| \multicolumn{4}{c}{PROJECTION OPTICAL SYSTEM OF SECOND NUMERICAL EXAMPLE} |
| K | −1.135665E+00 | −8.558219E−01 | −3.436783E+00 |
| A1 | 0.000000E+00 | 0.000000E+00 | −4.879045E−02 |
| A2 | 0.000000E+00 | 0.000000E+00 | 5.647127E−04 |
| A3 | 0.000000E+00 | 0.000000E+00 | 1.521780E−06 |
| A4 | −1.049353E−05 | −1.574293E−05 | 4.301856E−09 |
| A5 | 0.000000E+00 | 0.000000E+00 | −7.332079E−11 |
| A6 | −1.215685E−08 | 9.708738E−09 | −1.954330E−13 |
| A7 | 0.000000E+00 | 0.000000E+00 | 1.676427E−15 |
| A8 | 5.415930E−12 | −2.915744E−11 | 3.683002E−18 |
| A9 | 0.000000E+00 | 0.000000E+00 | −4.522384E−20 |
| A10 | 2.318807E−15 | 2.181742E−14 | −1.332571E−21 |
| A11 | 0.000000E+00 | 0.000000E+00 | 3.697682E−23 |
| A12 | 0.000000E+00 | 0.000000E+00 | −1.952918E−25 |

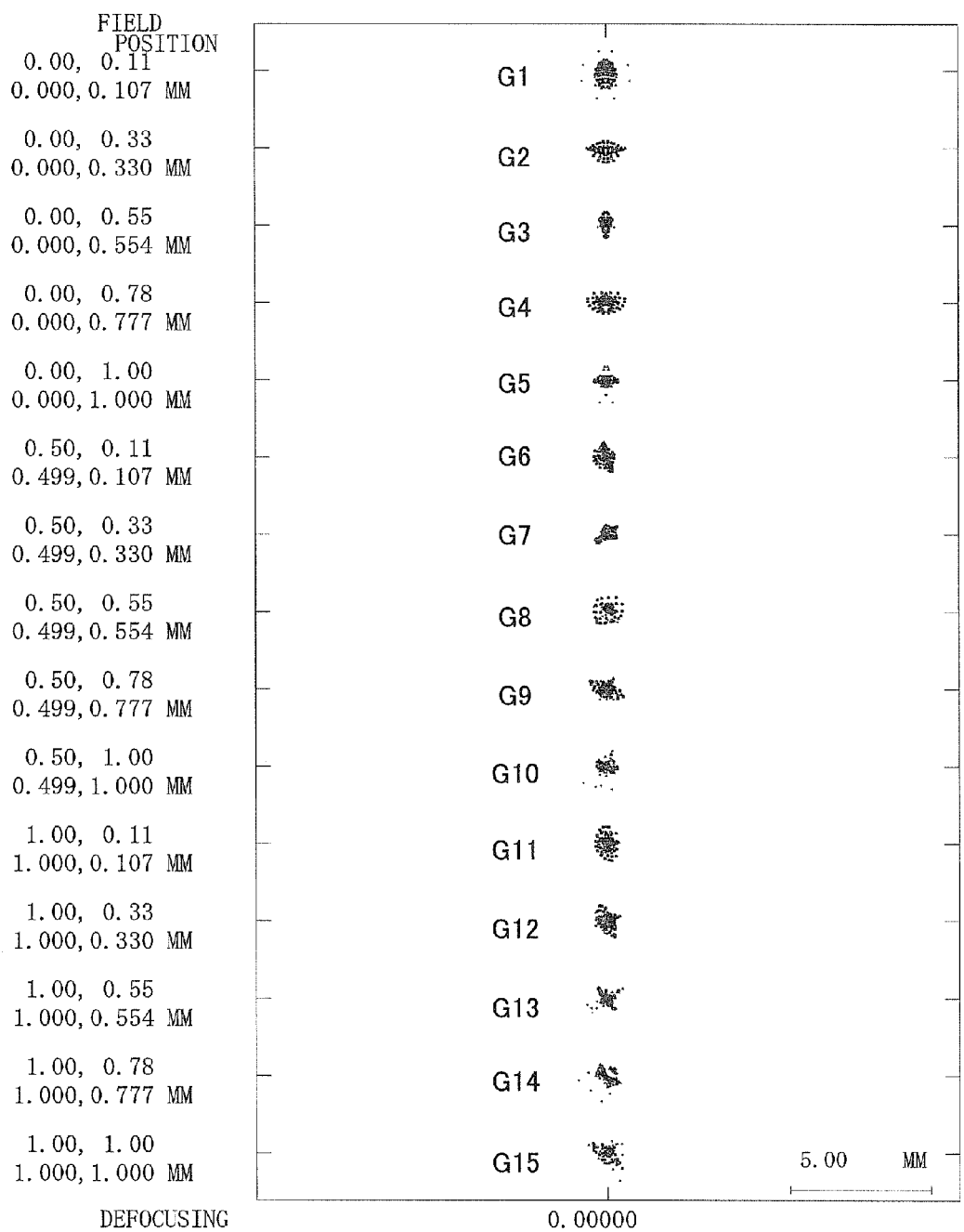

PROJECTION OPTICAL SYSTEM AND IMAGE DISPLAY APPARATUS

BACKGROUND OF THE INVENTION

1. Field of the Invention

The present invention relates to a projection optical system enlarging and projecting a modulated light which has been emitted from a small-size image display panel and an image display apparatus including the projection optical system.

2. Description of the Related Art

A projection type (rear-projection type) image display apparatus is known as a scheme to realize a large-screen image display apparatus at low cost. However, there is a problem that such a projection type image display apparatus requires a space for a projection optical path, thereby a depth and a height of the apparatus increase. As improvement schemes for this, it is proposed that a projection light from a projection optical system which includes a lens system and a power mirror is projected onto a projection surface (a screen surface) not vertically but obliquely, thereby a depth size or a height size of the apparatus are reduced.

For example, Japanese Patent Kokai Publication No. 2007-323047 as Patent Document 1 (FIG. 4, FIG. 5 and so on) describes that a modulated light emitted from a lens system is bent by a plane mirror in a horizontal direction before entering a power mirror, thereby reducing a depth size of an image display apparatus.

Further, Japanese Patent Kokai Publication No. 2007-94405 as Patent Document 2 (FIG. 2, FIG. 4 and so on) describes that a modulated light emitted from a lens system is bent upward by a plane mirror before entering a convex mirror, thereby an image display apparatus is reduced in depth size and height size.

However, in conventional projection optical systems, a light flux is always in a state of divergence in an optical path after an emission from a lens system to an incidence on a convex mirror. For this reason, there is the following problem: in order to arrange so that a modulated light after the emission from the lens system to the incidence on the convex mirror does not interfere with another element (e.g., a bottom end of a screen), it is required to provide a large space in a lower part below the screen in the image display apparatus, and thus a height size of the image display apparatus cannot be sufficiently reduced (a height of the lower part below the screen).

A projection optical system of the image display apparatus described in the Patent Document 1 has the following problems that: because the modulated light which is emitted from the lens system and enters the power mirror widely diverges, the plane mirror for bending the modulated light is very large in size. In order to arrange the large plane mirror so as not to interfere with the modulated light which travels from the power mirror to a screen, a large space is required in a lower part below the screen in a housing of the image display apparatus and the image display apparatus cannot be sufficiently reduced in height size (a base-portion-height of the lower part below the screen).

A projection optical system of the image display apparatus described in the Patent Document 2 has the following problems that: because the modulated light which is emitted from the lens system and enters the convex mirror diverges, the plane mirror for bending the modulated light is large in size; and because of the structure that the modulated light is bent upward by the plane mirror, the image display apparatus cannot be sufficiently reduced in height size (a height of a lower part below a screen).

SUMMARY OF THE INVENTION

It is therefore an object of the present invention to provide a projection optical system which enables to reduce a height of a lower part of an image display apparatus and the image display apparatus in which the height of the lower part is small.

According to one aspect of the present invention, a projection optical system for enlarging and projecting a light flux from an image display panel modulating an irradiation light, onto a screen in an oblique direction, includes: a lens system including a plurality of lenses, the lens system refracting the light flux from the image display panel; and a single convex mirror reflecting the light flux from the lens system, the lens system and the convex mirror being arranged in an order from the image display panel; wherein: the lens system emits the light flux in a state of convergence, and the light flux in a state of convergence once converges in an optical path after an emission from the lens system to an incidence on the convex mirror, and then the light flux in a state of divergence enters the convex mirror.

According to another aspect of the present invention, a projection optical system for enlarging and projecting a light flux from an image display panel modulating an irradiation light, onto a screen in an oblique direction, includes: a lens system including a plurality of lenses, the lens system refracting the light flux from the image display panel; a single convex mirror reflecting the light flux from the lens system, the lens system and the convex mirror being arranged in an order from the image display panel; and a stop disposed in an optical path after an emission from the lens system to an incidence on the convex mirror.

According to still another aspect of the present invention, an image display apparatus includes the above-mentioned projection optical system; and a screen, onto which a light flux emitted from the projection optical system is projected.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 24 is a diagram illustrating an example of numerical values in a first numerical example of the projection optical system according to the second embodiment;

FIG. 25 is a diagram illustrating aspheric data in the first numerical example of the projection optical system according to the second embodiment;

FIG. 32 is a diagram illustrating an example of numerical values in a second numerical example of the projection optical system according to the fourth embodiment;

FIG. 33 is a diagram illustrating aspheric data in the second numerical example of the projection optical system according to the fourth embodiment;

FIG. 40 is a diagram illustrating spot diagrams when the second numerical example is applied to the projection optical system according to the fourth embodiment.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

An image display apparatus of a comparison example which is used for explaining embodiments of the present invention will be described below, and then the first, second, third and fourth embodiments of the present invention will be described.

COMPARISON EXAMPLE

Figure 1:
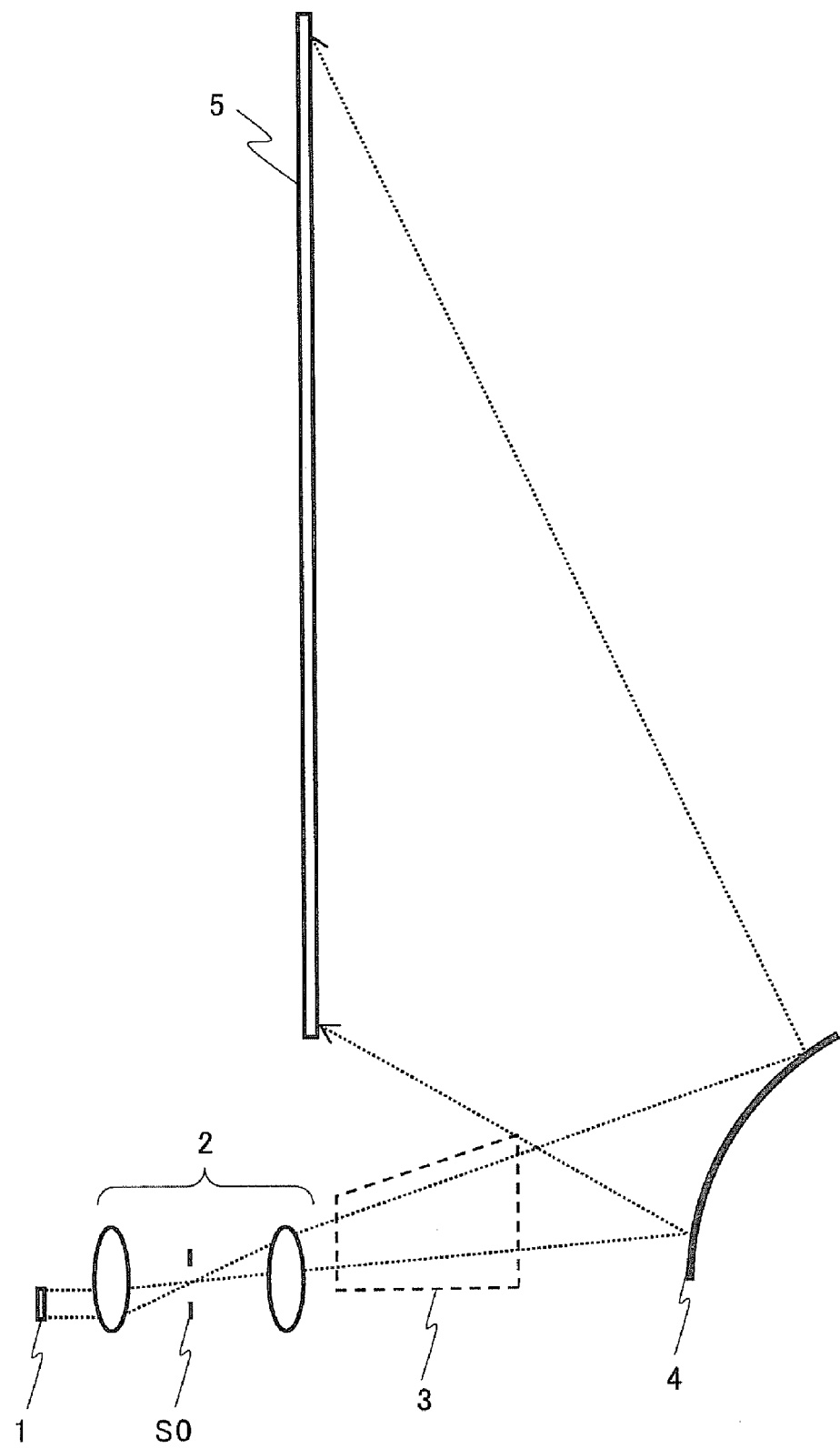
FIG. 1 is a diagram schematically illustrating an internal structure of an image display apparatus of a comparison example (an internal structure in a case where it is assumed that no plane mirror is provided)
Figure 2:
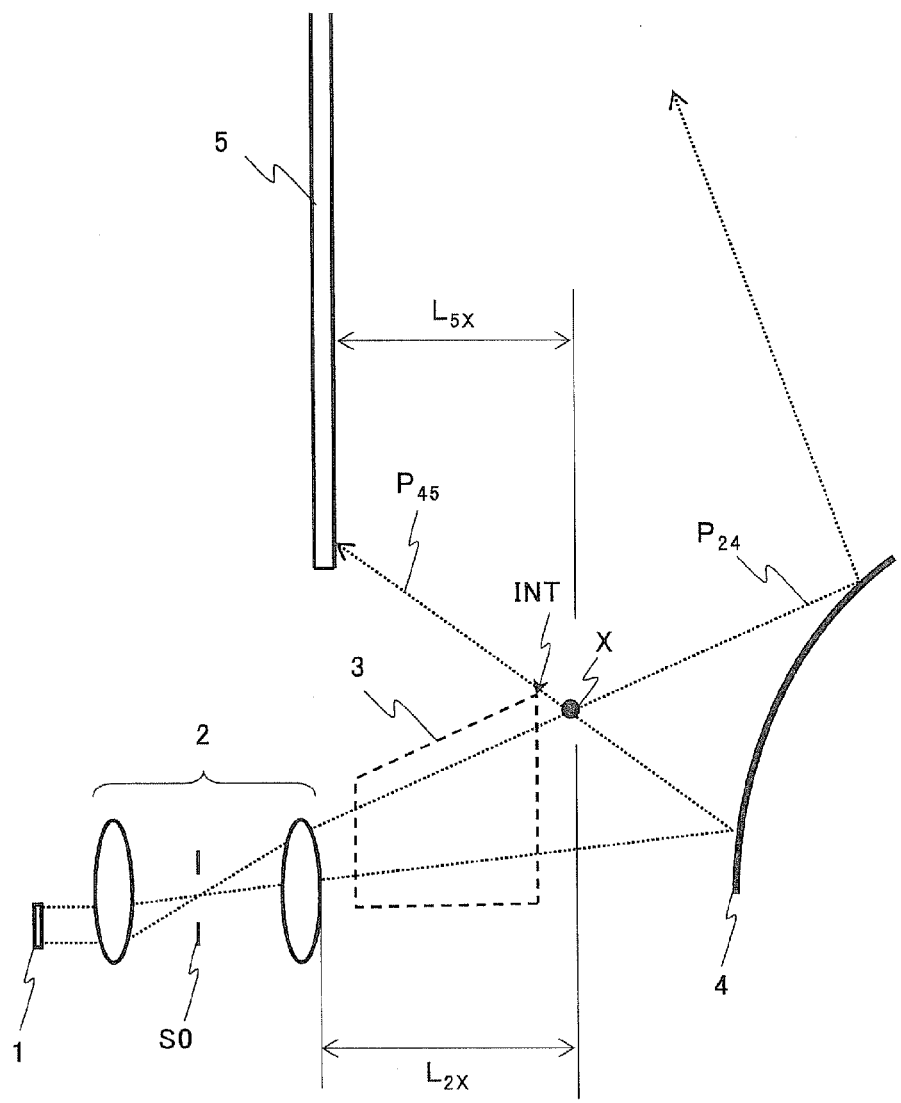
FIG. 2 is a diagram illustrating an enlargement of a structure of a projection optical system in the image display apparatus of the comparison example (a structure in a case where it is assumed that no plane mirror is provided)
Figure 3:
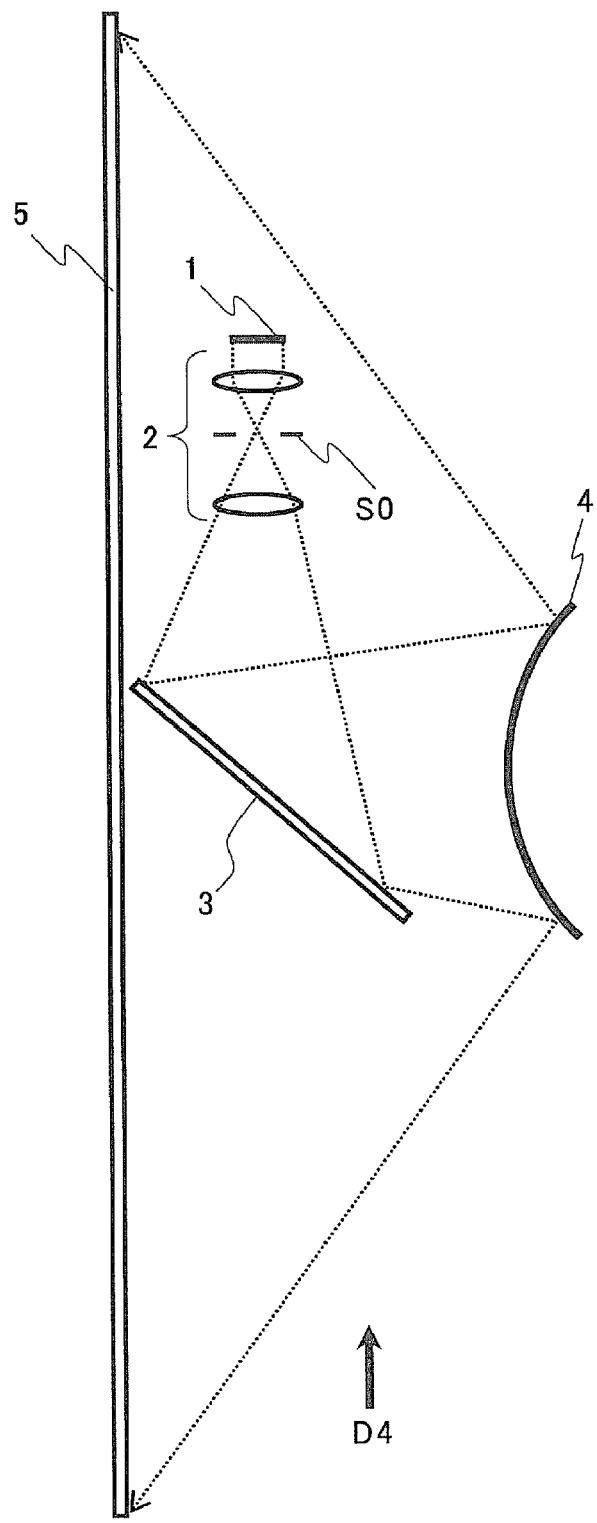
FIG. 3 is a plan view schematically illustrating an internal structure of the image display apparatus of the comparison example (an internal structure in a case where a plane mirror is provided)
Figure 4:
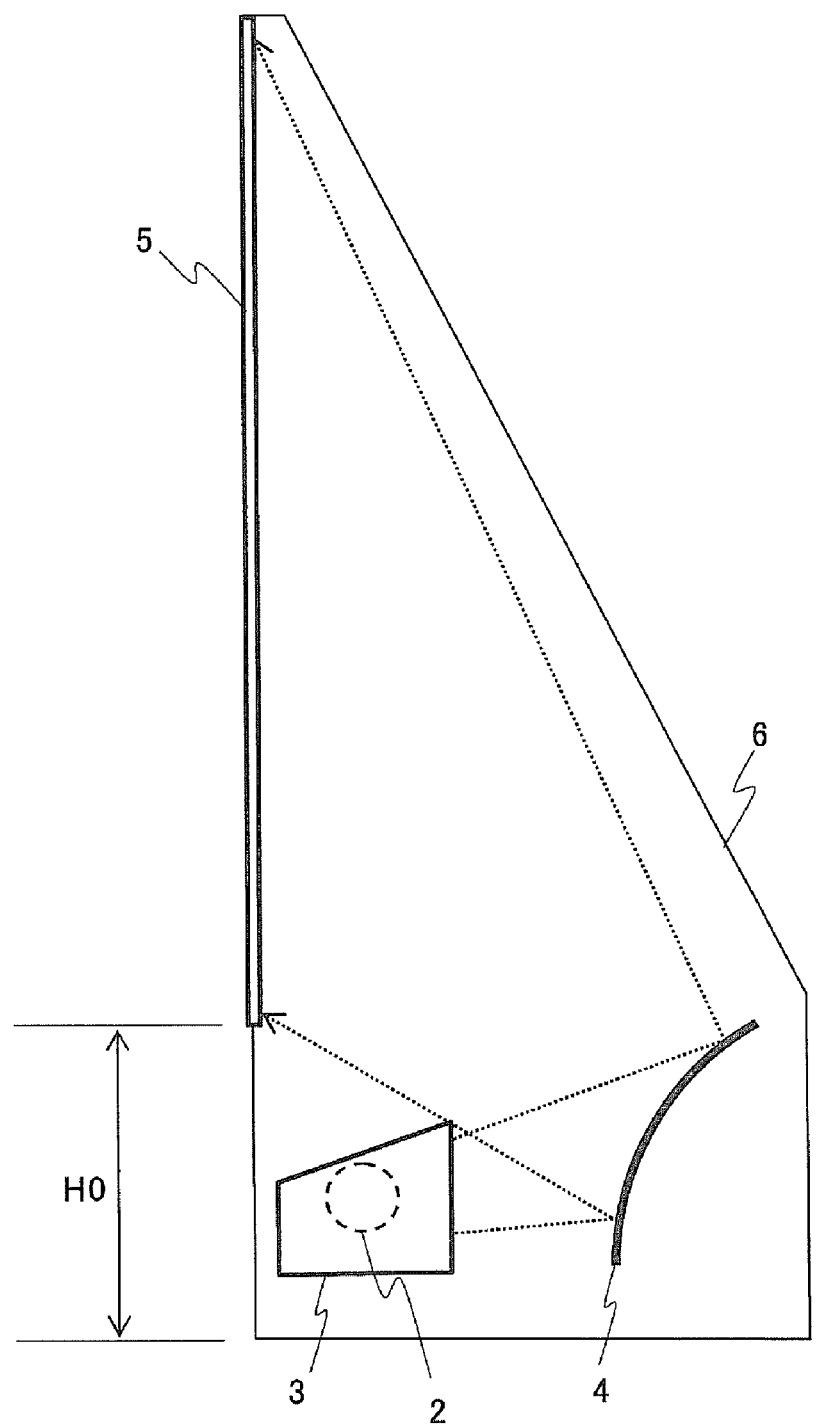
FIG. 4 is a schematic side view of the internal structure of the image display apparatus of the comparison example when seen in a D4-direction of FIG. 3.

FIG. 1 is a diagram schematically illustrating an internal structure of an image display apparatus of the comparison example (an internal structure in a case where it is assumed that no plane mirror is provided), and FIG. 2 is a diagram illustrating an enlargement of a structure of a projection optical system in the image display apparatus of the comparison example of FIG. 1 (a structure in a case where it is assumed that no plane mirror is provided). FIG. 1 and FIG. 2 are diagrams for explaining a relationship between the structure of the projection optical system in the image display apparatus of the comparison example and a height H0 of a lower part below a screen, in a case where it is assumed that a modulated light is not bent by a plane mirror 3. FIG. 3 is a plan view schematically illustrating an internal structure of the image display apparatus of the comparison example (an internal structure in a case where the plane mirror is provided), and FIG. 4 is a schematic side view of the internal structure of the image display apparatus of the comparison example when seen in a D4-direction of FIG. 3.

As shown in FIG. 1 to FIG. 4, the image display apparatus of the comparison example has an image display panel 1, a lens system 2 including two lens groups and a stop S0 and emitting a modulated light as a divergent light, the plane mirror 3 bending the modulated light emitted from the lens system 2, a convex mirror 4 enlarging and projecting the modulated light from the plane mirror 3, and a screen 5 receiving the projection light from the convex mirror 4 and displaying an image. In the comparison example, the image display panel 1 modulates a light from a light source, which is not shown in the drawings, and emits a modulated light. The modulated light is refracted by the lens system 2, bent by the plane mirror 3, reflected by the convex mirror 4, enlarged and projected onto the screen 5. In the lens system 2, the light flux once converges at the stop S0 in the lens system 2 and then diverges. In a case that an intermediate image is formed in the lens system 2, the light flux in a state of divergence is emitted from the lens system 2.

It is required to arrange the lens system 2 and the convex mirror 4 apart from each other in some degree, in order to secure optical properties such as a distortion. If an overall length of the lens system 2 is short, it is required to strengthen powers of the lens groups of the lens system 2 and it is difficult to correct various optical aberrations in the lens system 2 well. For this reason, it is required that the lens system 2 has a long overall length in some degree. As shown in FIG. 1 and FIG. 2, in a case that the plane mirror 3 is not disposed and the lens system 2 and the convex mirror 4 are linearly arranged, the image display panel 1 and the lens system 2 protrude ahead of the screen 5 (an opposite side to the convex mirror 4 with respect to a surface of the screen 5) and it is not desirable in view of a design of a housing of the image display apparatus (reference numeral 6 in FIG. 4). For this reason, in a case that the projection optical system is accommodated in the housing 6 of the image display apparatus, as shown in FIG. 3 and FIG. 4, it is desirable that the plane mirror 3 be arranged in an optical path after an emission from the lens system 2 to an incidence on the convex mirror 4 to bend the optical path.

As can be understood from FIG. 1 to FIG. 4, in the comparison example, a light flux diverges in the entire optical path after an emission from the lens system 2 to an incidence on the convex mirror 4. For this reason, a light flux having a larger diameter enters the plane mirror 3 in comparison with a diameter of a light flux at the emission from the lens system 2 and it is required to increase the plane mirror 3 in size. However, if a size of the plane mirror 3 is increased, it is required that the screen 5 is disposed further upward (in a direction further away from the projection optical system), in order to arrange the plane mirror 3 within the housing 6 so as not to interfere with a modulated light (projection light) which travels from the convex mirror 4 to the screen 5 (so as not to interrupt the projection light at a position INT shown in FIG. 2), thereby the height H0 of the lower part of the image display apparatus increases.

In order to reduce the height H0 of the lower part of the image display apparatus, it is required to reduce the plane mirror 3 in size, that is, as shown in FIG. 2, it is required to arrange a point of intersection X of a light ray $P_{24}$ which is a top ray of a light flux which travels from the lens system 2 to the convex mirror 4 and a light ray $P_{45}$ which is a bottom ray of a light flux which travels from the convex mirror 4 to the screen 5, as low as possible. However, in FIG. 2, if the screen 5 is moved downward, the point of intersection X approaches the screen 5 along the light ray $P_{24}$ (a horizontal distance $L_{5X}$ from the point of intersection X to the screen 5 decreases). The plane mirror 3 is required to move in a direction away from the convex mirror 4, and accordingly the projection optical system protrudes ahead of the screen 5.

In a case that an angle of the light ray $P_{24}$ with respect to a horizontal direction is steep (the light flux emitted from the lens system 2 diverges further widely), under a condition that a size of the convex mirror 4 is constant, the point of intersection X approaches the convex mirror 4 in a direction along the light ray $P_{45}$ (the distance $L_{5X}$ increases), however, at the same time, it is required to reduce a distance between the lens system 2 and the convex mirror 4. For this reason, it is required to reduce a horizontal distance $L_{2X}$ from the lens system 2 to the point of intersection X and accordingly enough space cannot be provided for the plane mirror 3. If the size of the convex mirror 4 increases, the point of intersection X approaches the screen 5 along the light ray $P_{45}$ (the distance $L_{5X}$ decreases) and the plane mirror 3 undesirably protrudes ahead of the screen 5.

Moreover, if a diameter of the lens system 2 and the size of the convex mirror 4 are reduced in order to shift the light ray $P_{24}$ downward, it becomes difficult to correct aberrations such as a distortion and to secure appropriate optical properties. In order to shift the light ray $P_{24}$ downward without reducing the diameter of the lens system 2, it is required to reduce the distance between the lens system 2 and the convex mirror 4. As a result, the horizontal distance $L_{2X}$ decreases, and accordingly enough space cannot be provided for the plane mirror 3.

In order to provide a space for the plane mirror 3, if the diameter of the lens system 2 and the size of the convex mirror 4 are fixed and the distance between the lens system 2 and the convex mirror 4 increases, the point of intersection X approaches the screen 5 along the light ray $P_{45}$ and moves upward at the same time. Even if the plane mirror 3 is not provided in the structure of FIG. 2, it is required to dispose the lens system 2 below a bottom end of the screen 5 in some degree in order to prevent an interference between the divergent light flux $P_{24}$ which travels from the lens system 2 to the convex mirror 4 and the bottom end of the screen 5.

As described above, in the image display apparatus of the comparison example, the light flux diverges in the entire optical path after the emission from the lens system 2 to the incidence on the convex mirror 4. For this reason, it is difficult to arrange the point of intersection X sufficiently below, at the same time the horizontal distances $L_{2X}$ and $L_{5X}$ are appropriately secured, and consequently it is difficult to reduce the height H0 of the lower part of the image display apparatus.

First Embodiment

Figure 5:
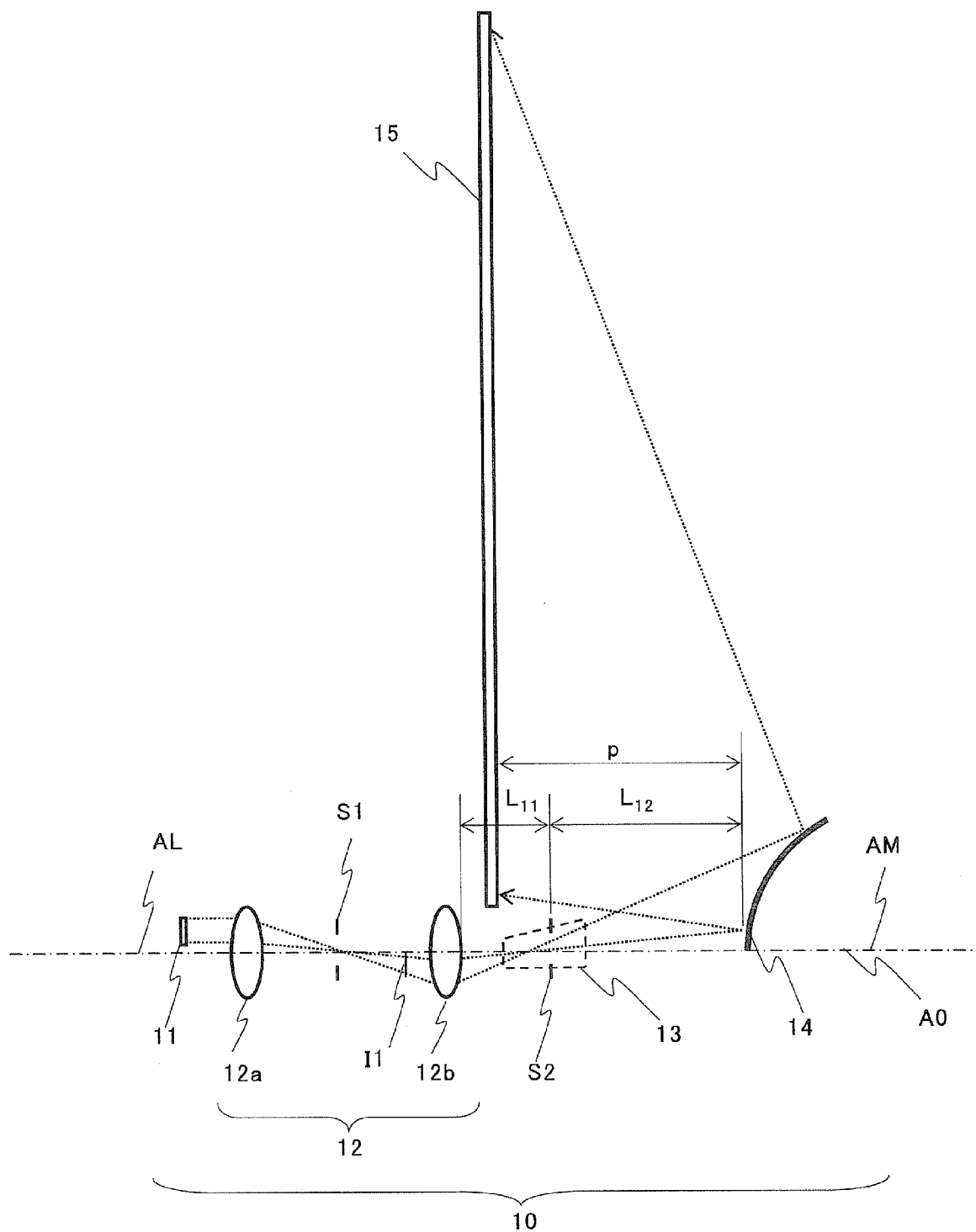
FIG. 5 is a diagram schematically illustrating an example of an internal structure of an image display apparatus according to a first embodiment of the present invention (an internal structure in a case where it is assumed that no plane mirror is provided)
Figure 6:
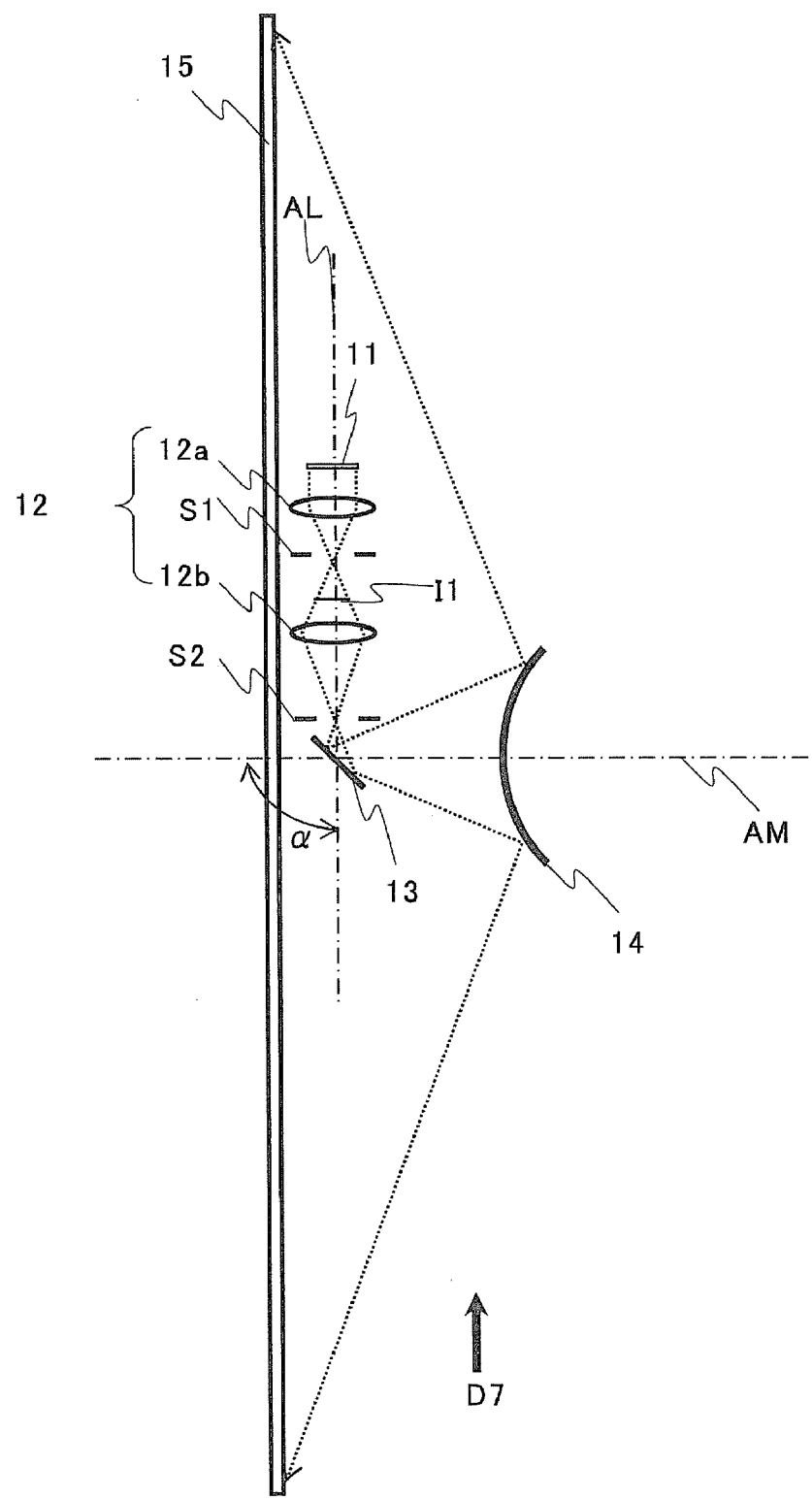
FIG. 6 is a plan view schematically illustrating an example of an internal structure of the image display apparatus according to the first embodiment.

FIG. 5 is a diagram schematically illustrating an example of an internal structure of the image display apparatus according to a first embodiment of the present invention (an internal structure in a case where it is assumed that no plane mirror is provided). FIG. 6 is a plan view schematically illustrating an example of an internal structure of the image display apparatus according to the first embodiment of the present invention, and FIG. 7 is a schematic side view of the internal structure of the image display apparatus according to the first embodiment when seen in a D7-direction of FIG. 6.

Figure 7:
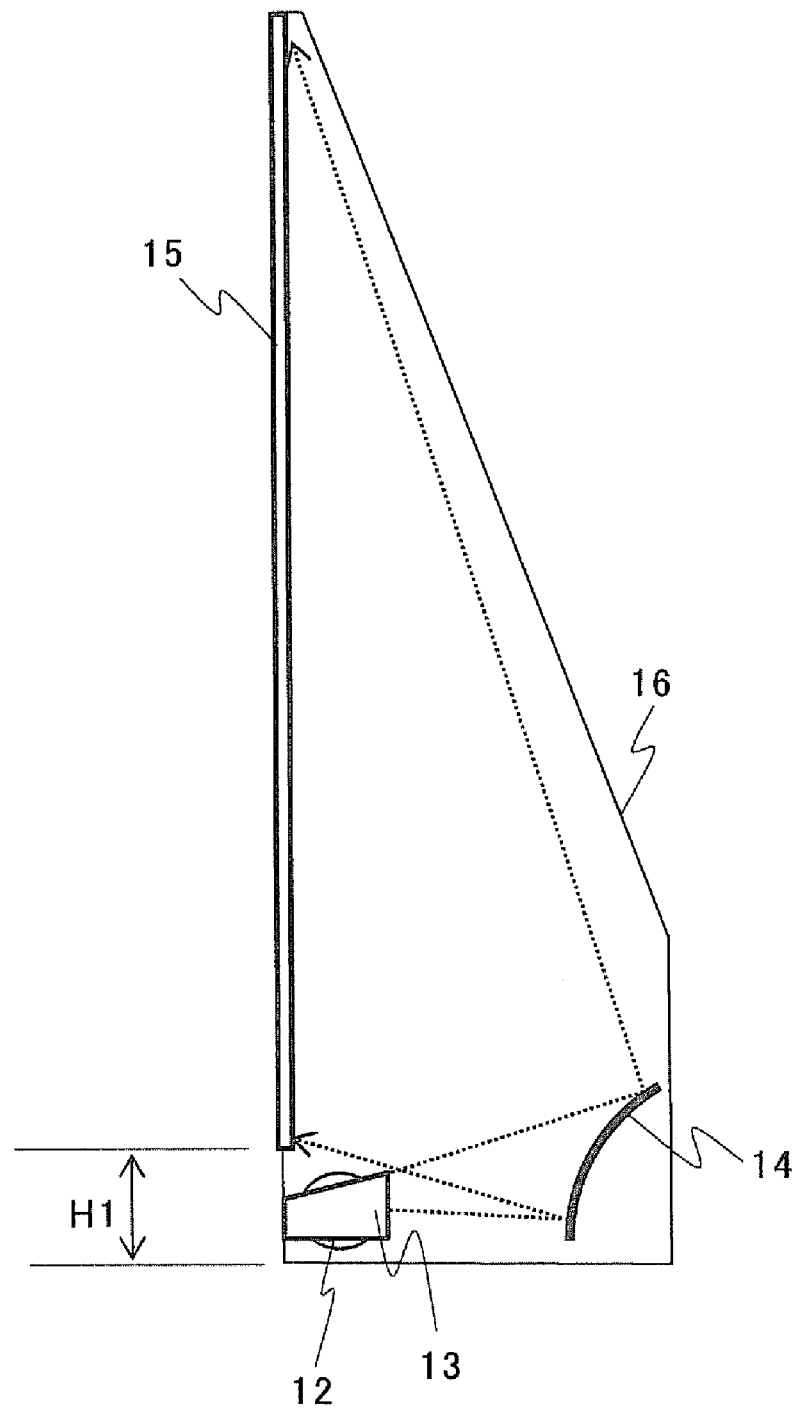
FIG. 7 is a schematic side view of the internal structure of the image display apparatus according to the first embodiment when seen in a D7-direction of FIG. 6.

As shown in FIG. 5 to FIG. 7, the image display apparatus according to the first embodiment has a housing 16, a projection optical system 10 disposed inside the housing 16, and a screen 15 disposed on a front surface of the housing 16, wherein a light flux of a modulated light emitted from the projection optical system 10 is projected onto the screen 15. In the first embodiment, the projection optical system 10 which is disposed below the screen 15 in the housing 16 enlarges and projects the modulated light which includes image information onto the screen 15 from obliquely below on a side of a back surface of the screen 15. Although the following explanation concerns the example of the projection optical system 10 which is disposed below the screen 15, a position of the projection optical system 10 is not limited to below the screen 15 and the projection optical system 10 can be disposed in a position which is adjacent to any edge of the screen 15 (substantially outside the screen 5), for example, on the upper side or left side or right side of the screen 15. FIG. 5 illustrates an arrangement of a plane mirror 13 by a broken line and an arrangement of a lens system 12 and a convex mirror 14 in the case where it is assumed that the plane mirror 13 is not provided, that is, in the case of a linear arrangement. However, an actual structure of the projection optical system 10 includes the plane mirror 13, as shown in FIG. 6 or FIG. 7.

The projection optical system 10 has an image display panel 11 emitting a modulated light which has been modulated on the basis of an input image signal, the lens system 12 refracting the modulated light which has been emitted from the image display panel 11 to emit as a converging light flux, the plane mirror 13 bending the light flux (modulated light) which has been emitted from the lens system 12, and the convex mirror 14 reflecting the light flux (modulated light) which has been bent by the plane mirror 13, enlarging and projecting the light flux.

The lens system 12 and the convex mirror 14 are arranged so that a light flux converges at a convergence point in an optical path from the lens system 12 to the convex mirror 14, and then becomes a divergent light flux. The projection optical system 10 includes a stop S2 disposed in the optical path from the lens system 12 to the convex mirror 14. Although the stop S2 is disposed so that the light flux to be bent by the plane mirror 13 is the light flux which has passed the stop S2, it is possible also to be disposed so that the light flux which has been bent by the plane mirror 13 passes the stop S2. However, in a case that the stop cannot be disposed because the stop interferes with the plane mirror 13, it is possible that the stop S2 is not provided. In other words, there is a case that a member having a mechanical aperture need not be actually disposed in a 'stop position' where the stop S2 ought to be disposed, and the 'stop position' in such a case indicates a position which is near the position where the stop ought to be disposed and where a diameter of the light flux is the smallest.

As the image display panel 11, a DMD (digital micromirror device) or a transmissive or reflective liquid crystal panel can be used, for example. A display surface of the image display panel 11 having a two-dimensional pixel structure on its surface modulates an irradiation light on the basis of an image signal for each pixel, thereby forms an image. In the first embodiment, the image display panel 11 modulates a light from a light source shown in FIG. 13 which will be described below on the basis of an image signal and emits a modulated light.

The lens system 12 includes a first lens group 12a disposed on a side of the image display panel 11, a second lens group disposed on a side of the convex mirror 14, and a stop (hereinafter also referred to as 'lens-system-stop') S1 disposed between the first lens group 12a and the second lens group 12b in the lens system. In the lens system 12, a light flux from the first lens group 12a once converges at the lens-system-stop S1 and diverges, then converges by the second lens group 12b and diverges after the convergence point. It can be configured to form an intermediate image I1 in the lens system 12 without providing the lens-system-stop S1, and in this case also, a converged light can be emitted from the lens system 12. The converged light from the lens system 12 becomes a divergent light after the convergence point, is bent by the plane mirror 13 near the convergence point, is reflected by the convex mirror 14, and is enlarged and projected onto the screen 15.

To configure a rear-projection type image display apparatus, the screen 15 of a transmissive type is used. The screen 15 can be mainly configured by a Fresnel lens and a lenticular lens which are arranged in an order from an entrance side of a light flux to an emission side. The Fresnel lens receives the divergent light flux from the convex mirror 14, parallelizes and transmits the divergent light flux and deflects the light flux in a direction of an observer. The lenticular lens including a plurality of cylindrical lenses on its surface receives the emitted light from the Fresnel lens, diffuses and emits in a horizontal direction or in both of the horizontal and vertical directions, and secures an appropriate viewing angle.

In a case that the image display panel 11 is formed by using a transmission-type or reflection-type liquid crystal panel, if inclined components which are not parallel with a normal line of a display surface increase in a light flux which passes through a liquid crystal layer, a leaked light increases and a background whitely floats when a dark image is displayed. As a side of the image display panel 11 is substantially telecentric, the projection optical system 10 according to the first embodiment can use a DMD as the image display panel 11 and can display a high-contrast projection image which includes less of leaked light, even if the case where the transmission-type or reflection-type liquid crystal panel is used.

In FIG. 5 and FIG. 6, reference numeral 'A0' denotes an optical axis of the projection optical system, 'AL' denotes a part of the optical axis A0 on a side of the image display panel 11 from the plane mirror 13, and 'AM' denotes a part of the optical axis A0 on a side of the convex mirror 14 from the plane mirror 13. The lens system 12 and the convex mirror 14 are coaxial optical systems having the common optical axis A0. The lens system 12 is configured to be substantially telecentric on the side of the image display panel 11. The image display panel 11 and the screen 15 are arranged so that both of a normal line direction of a display surface of the image display panel 11 and a normal line direction of a projection surface of the screen 15 are parallel to the optical axis A0. A center of the display surface of the image display panel 11 and a center of the screen 15 are disposed in positions which shift upward from the optical axis A0 (on a side of the screen 15). In other words, the projection optical system is an oblique projection optical system enlarging and projecting an image at a positive magnification above the optical axis A0.

A light flux from the image display panel 11 is refracted by the lens system 12, reflected by the plane mirror 13, is further reflected by the convex mirror 14, and is enlarged and projected onto the screen 15. The image of the image display panel 11 is finally formed on the screen 15, after the intermediate image I1 is formed in the lens system 12. Here, the intermediate image I1 of the image display panel 11 is formed as an inverted image (negative magnification) and formed as an erect image (positive magnification) on the screen 15.

Next, an image formation relationship in the projection optical system 10 will be described. Regarding the first lens group 12a, the image display panel 11 and the intermediate image I1 are in a conjugate relationship. Regarding the second lens group 12b, the lens-system-stop S1 and the stop S2 are in a conjugate relationship. Regarding a synthesizing optical system which includes the second lens group 12b and the convex mirror 14, the intermediate image I1 and the screen 15 are in a conjugate relationship. Regarding the whole projection optical system which includes the lens system 12 and the convex mirror 14, the image display panel 11 and the screen 15 are in a conjugate relationship. The convex mirror 14 forms the image of the image display panel 11 which is formed by the lens system 12, as a virtual object on the screen 15.

Next, states of convergence and divergence of a light flux in the projection optical system 10 will be described. Each of the first lens group 12a and the second lens group 12b includes a plurality of lenses and has a positive power as a whole. The light flux which is emitted from the image display panel 11 and enters the lens system 12 once converges, by the first lens group 12a, at the lens-system-stop S1 or near a position of the lens-system-stop S1 and diverges after the convergence. Then, the intermediate image I1 of the image display panel 11 is formed. The divergent light flux which has formed the intermediate image I1 enters the second lens group 12b, converges again by the second lens group 12b at the stop S2, diverges after the convergence and then enters the convex mirror 14. The diverged light flux which has entered the convex mirror 14 further diverges by the convex mirror 14 and then impinges on the screen 15.

As described in relation to FIG. 1 to FIG. 4, in the projection optical system of the comparison example, because a light flux which is emitted from the lens system 2 simply diverges, the plane mirror 3 bending an optical path increases in size and a height H0 of the lower part of the image display apparatus consequently increases. On the other hand, in the projection optical system 10 according to the first embodiment, a light flux after an emission from the lens system 12 to an incidence on the convex mirror 14 gradually decreases in its diameter and once converges at the stop S2 or near the position of the stop S2. For this reason, by arranging near the stop S2 the plane mirror 13 bending in a horizontal direction the optical path after the emission from the lens system 12 to the incidence on the convex mirror 14, the plane mirror 13 can be considerably reduced in vertical and horizontal sizes. As a result, it can be configured so that a light ray which travels from the convex mirror 14 to a bottom end of an image display area (an area which is used for displaying an image on the screen 15) of the screen 15 does not interfere with an upper end of the plane mirror 13 and the plane mirror 13 does not protrude ahead of the screen 15. In other words, the projection optical system 10 in the first embodiment can reduce a distance between the screen 15 which is disposed above the optical axis A0 and the optical axis A0 (an upward shift amount), thereby it is possible to realize the image display apparatus which has a small height (a height of the lower part of the apparatus in the first embodiment) H1 of a part where the projection optical system 10 is disposed in the image display apparatus.

It may be possible to make the apparatus thinner by placing a rear plane mirror (not shown in the drawing) substantially parallel to the screen 15 and bending the optical path from the convex mirror 14 to the screen 15 in FIG. 5. However, because of a physical restriction on the arrangement, the bottom end (bottom edge) of the image display area of the screen 15 cannot be disposed at or below an upper end of a light reflection area of the convex mirror 14. If the distance between the screen 15 and the optical axis A0 (the upward shift amount) is constant, a length of the optical path from the convex mirror 14 to the screen 15 increases when the rear mirror is disposed, in comparison with when the rear mirror is not disposed. For this reason, the light ray which travels from the convex mirror 14 to the bottom end of the image display area of the screen 15 forms a smaller angle with respect to the optical axis A0 and tends to interfere with the plane mirror 13. Thus, in order to reduce the height H1 of the lower part of the image display apparatus still more, it is preferable that the length of the optical path from the convex mirror 14 to the screen 15 be short, the rear mirror not be disposed and an image be directly projected onto the screen 15 from the convex mirror 14.

Referring to FIG. 5, it is desirable that $L_{11}$, $L_{12}$ and p satisfy the following conditional formulas:

$$L_{11} < L_{12} \tag{1}$$

$$p/2 \leq L_{12} \leq 2 \times p \tag{2}$$

where an optical axis distance between a lens surface which is closest to the convex mirror 14 in the second lens group 12b and the stop S2 is '$L_{11}$', an optical axis distance from the stop S2 to the convex mirror 14 is '$L_{12}$', and an optical axis distance from the convex mirror 14 to a surface of the screen 15 is 'p'.

The formula (1) defines an appropriate size relationship between the lenses of the second lens group 12b and the convex mirror 14. In other words, if the distance $L_{11}$ is larger than the distance $L_{12}$ on the right side of the formula (1), a diameter of the second lens group 12b is too large relative to the convex mirror 14, and the second lens group 12b interferes with the light flux which travels from the convex mirror 14 to the screen 15 when the optical path is bent by the plane mirror 13.

The formula (2) defines an appropriate range of the stop position. In other words, if the distance $L_{12}$ is smaller than a value of p/2 on the left side of the formula (2), it is difficult to arrange the plane mirror 13 without an interference with the light flux, and at the same time, it is difficult to secure good optical properties, because a power of the lens system 12 is too strong. On the other hand, if the distance $L_{12}$ is larger than a value of 2×p on the right side, a positional shift between the stop S2 and the plane mirror 13 is too large, the plane mirror 13 increases in size, and the plane mirror 13 interferes with the light flux which travels from the convex mirror 14 to the screen 15.

As shown in FIG. 6, in the projection optical system 10 according to the first embodiment, the optical axis AL of the lens system 12 and the optical axis AM of the convex mirror 14 form an angle α, which is more than 0° and substantially 90° in FIG. 6. The lens system 12 is disposed in a horizontal direction (a parallel direction to a sheet of paper on which FIG. 6 is illustrated) so as not to protrude ahead of the screen 15, and disposed in a vertical direction in a space between the light ray which travels from the convex mirror 14 to the bottom end of image display area of the screen 15 and a bottom surface of the housing which is not shown in the drawing. Thus, by bending the optical path by the plane mirror 13 in the horizontal direction, the lens system 12 and the image display panel 11 do not protrude ahead of the screen 15 and the light flux does not interfere with the plane mirror 13 and the lens system 12, thereby a thin image display apparatus in which the height H1 of the lower part is small can be realized. Although the angle α is a substantially right angle in FIG. 6, the angle α is not limited to a substantially right angle and the angle α can be an acute angle to an extent that the lens system 12 does not interfere with the light flux. A value of the angle α is desirably in a range of $20° \leq \alpha \leq 90°$. The reason why the range is desirable is as follows: if the angle α is smaller than 20°, the convex mirror 14 interferes with the lens system 12, the image display panel 11 or the like, and if the angle α is larger than 90°, the lens system 12 and the image display panel 11 protrude ahead of the screen 15.

Because the convex mirror 14 has a higher-order aspheric shape and a large negative power, the convex mirror 14 receives a light flux which has been emitted from the lens system 12 and the light flux further widely diverges obliquely above toward the screen 15. It is not preferable that the lens system 12 has a large power so that the light flux diverges, because a color aberration increases. On the contrary, because the convex mirror 14 theoretically produces no color aberration, the convex mirror 14 is capable of a large power and a single-focus wide-angle projection can be easily achieved. Thus, by shifting the image display panel 11 and the screen 15 upward from the optical axis A0, performing a projection obliquely from the convex mirror 14 toward the screen 15 (projection obliquely upward) and reducing a projection distance, a thin image display apparatus can be realized.

Generally, it is easier to correct a distortion as a height from an optical axis of a principal ray increases. Accordingly, if the convex mirror 14 is disposed at a fixed distance from the lens system 12 and is higher-order aspheric of a comparatively large size to improve its design flexibility, a distortion which is a problem especially in a fixed focal length projection image display apparatus can be sufficiently corrected. On the contrary, if the convex mirror 14 is extremely small in size, it is difficult to correct a distortion. In FIG. 5, only a part above the optical axis A0 which actually receives a light flux and functions effectively is illustrated.

Because the convex mirror 14 has a relatively large size as described above, it is difficult to manufacture by a glass molding in view of precision and the like and it is desirable to manufacture the convex mirror 14 by a resin molding. In this case, if the convex mirror 14 has an external shape of a substantially trapezoid which includes an effective range where a light flux is actually reflected and a margin such as a holder at surroundings to have a smallest volume of the resin, the convex mirror 14 can be manufactured in a shorter molding time and with low cost.

Figure 8:
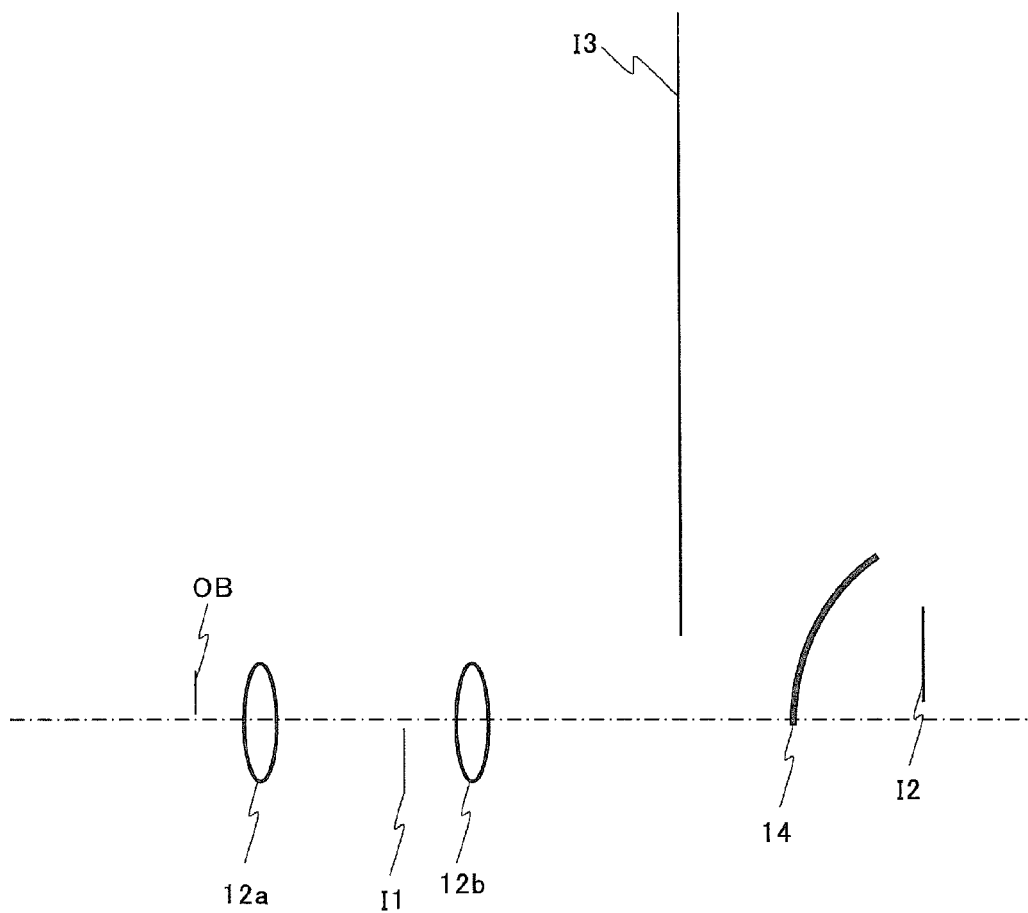
FIG. 8 is a diagram illustrating an example of an image formation relationship in a projection optical system in the image display apparatus according to the first embodiment.

Next, correcting a curvature of field in the projection optical system 10 will be described. FIG. 8 is a diagram illustrating an example of an image formation relationship in the projection optical system 10 of the image display apparatus according to the first embodiment. Elements in FIG. 8 which are the same as those in FIG. 5 are denoted by the same reference symbols. In FIG. 8, 'OB' denotes a display surface of the image display panel 11, 'I2' denotes an image of I1 formed by the second lens group 12b (equals to an image of OB formed by the lens system 12), and 'I3' denotes an image of I2 formed by the convex mirror 14 (equals to the image of OB formed by the whole projection optical system, the image of I1 formed by the synthesizing optical system which includes the second lens group 12b and the convex mirror 14, and the final image projected onto the screen 15). Here, the image I2 is a virtual object with respect to the convex mirror 14.

Figure 9:
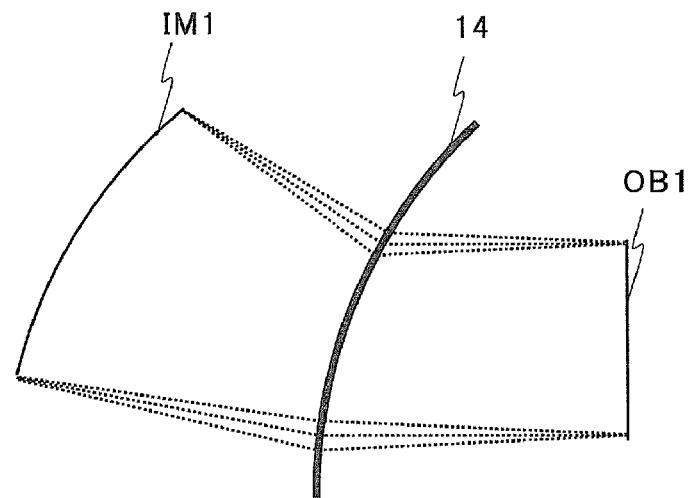
FIG. 9 is a diagram illustrating an example of a curvature of field caused by a convex mirror.

FIG. 9 is a diagram illustrating an example of a curvature of field caused by the convex mirror 14 and a state that an image of a plane object is formed near the optical axis. In FIG. 9, 'OB1' is the plane object (a virtual object with respect to the convex mirror 14) and 'IM1' is an image of the plane object OB1 by the convex mirror 14. As can be understood from FIG. 9, the image IM1 of the plane object OB1 by the convex mirror 14 is curved in a direction closer to the convex mirror 14 as an image height increases.

Figure 10:
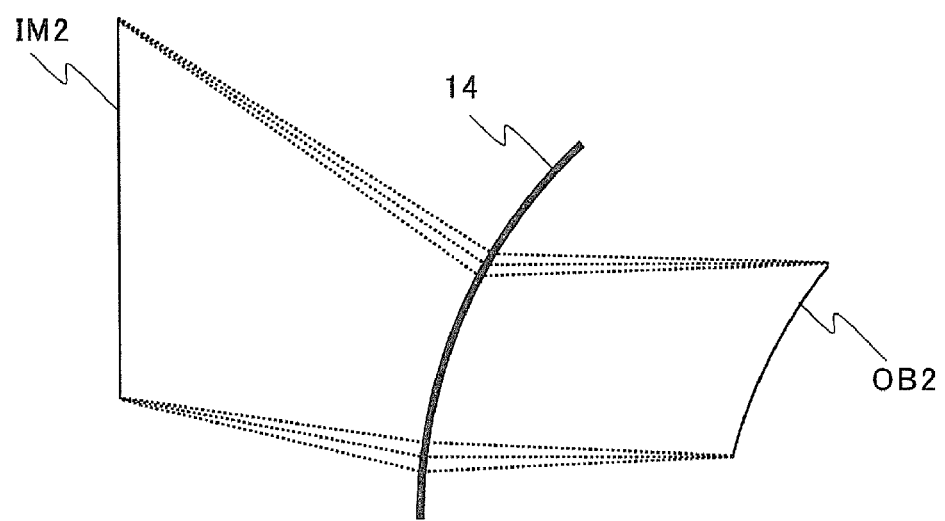
FIG. 10 is a diagram illustrating an example of a manner of correcting the curvature of field caused by the convex mirror.

FIG. 10 is a diagram illustrating an example of a manner of correcting a curvature of field which is produced by the convex mirror 14 and a state that an image of the curved object is formed near the optical axis. In FIG. 10, 'OB2' is the curved object (a virtual object with respect to the convex mirror 14) and 'IM2' is an image of the object OB2 by the convex mirror 14. As can be understood from FIG. 10, when the curved object OB2 is curved in advance in a direction away from the convex mirror 14 as an object height increases, the curvature of field produced by the convex mirror 14 which is described in relation to FIG. 9 is canceled and the plane image IM2 can be obtained.

In view of the above explanation, in the projection optical system 10 according to the first embodiment, an image formed by the lens system 12 near an optical axis of the image display panel 11 is a virtual object with respect to the convex mirror 14. Moreover, the image is curved in a direction away from the convex mirror 14 as an image height increases, and cancels the curvature of field produced by the convex mirror 14. Thus, a plane image with no curve can be displayed on the screen 15.

A curvature of field of a thin lens is determined by a power of a lens and a refractive index. For this reason, by taking account of powers of the lenses of the lens groups in the lens system 12 and a refractive index, the desirable curvature of field described above can be produced in the lens system 12. In particular, because both of the first lens group 12a and the second lens group 12b in the lens system 12 have positive powers, an image plane tends to curve in a direction closer to the lens groups as an image height increases. In this case, an arbitrary combination of a lens having a negative power functions to cancel a curvature of field caused by a lens having a positive power, thereby the curvature of field in the lens system 12 can be appropriately controlled.

Figure 11:
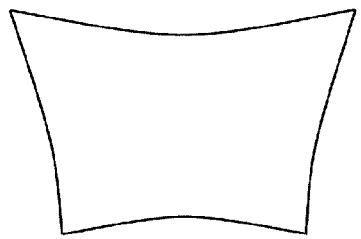
FIG. 11 is a diagram illustrating an example of a distortion caused by the convex mirror.

Correcting a distortion in the projection optical system will be described below. FIG. 11 is a diagram illustrating an example of a distortion produced by the convex mirror 14 and illustrates a distorted image which is formed when an image of a rectangular object is formed by the convex mirror 14. The convex mirror 14 having a large negative power produces a pincushion-like distortion as shown in FIG. 11.

Figure 12:
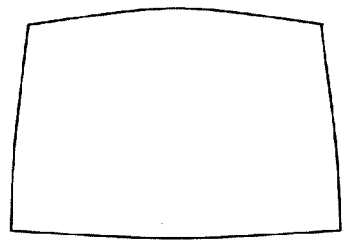
FIG. 12 is a diagram illustrating an example of a distortion caused by a lens system.

Likewise, FIG. 12 is a diagram illustrating another example of a distortion produced by the lens system 12 and illustrates a distorted image which is formed when an image of a rectangular object is formed by the lens system 12. The lens system 12 includes a first lens group 12a having a positive power and a second lens group 12b having a positive power and causes a barrel-like distortion shown in FIG. 12, contrary to the pincushion-like distortion by the convex mirror 14 shown in FIG. 11. In other words, in the projection optical system according to the first embodiment, the pincushion-like and the barrel-like distortion which are produced by the convex mirror 14 and a refraction lens 20, respectively, cancel with each other, thereby an image without distortion can be displayed on the screen 15.

Next, an image formation magnification of an intermediate image will be described. In FIG. 8, it is desirable that a size of the intermediate image I1 which is formed by the first lens group 12*a* be larger than a size of the display surface OB of the image display panel 11. In other words, it is desirable that a magnification when the first lens group 12*a* forms an image of the display surface OB of the image display panel 11 as the intermediate image I1 be an enlarging magnification.

In view of a function to form the intermediate image I1 on the screen 15 as the final image I3, it can be considered that the synthesizing optical system which includes the second lens group 12*b* and the convex mirror 14 has the same function as that of the projection optical system of the comparison example which includes the lens system 2 and the convex mirror 4. Here, suppose if a size of the image display panel 11 is 0.5 inches and a size of the screen 15 is 65 inches, the image formation magnification is a 130-power magnification, that is, an extremely high magnification is required. In this case, suppose if the image formation magnification of the first lens group 12*a* is a reducing magnification, it is equivalent to reduce further a size of the image display panel (reference numeral 1 in FIG. 1) in the projection optical system of the comparison example. An over 130-power magnification is required and it is difficult to secure optical properties such as a resolution. This is equivalent, in the projection optical system 10 according to the first embodiment, to that an extremely large magnification is required when the synthesizing optical system forms the intermediate image I1 on the screen 15 as the final image I3, and thus it makes difficult to secure desirable optical properties by the synthesizing optical system. For this reason, it is desirable that the image formation magnification of the first lens group 12*a* is an enlarging magnification and an image formation magnification of the synthesizing optical system which includes the second lens group 12*b* and the convex mirror 14 is not extremely large.

Moreover, there is the following advantage to correct another aberration which cannot be sufficiently corrected by the projection optical system of the comparison example, configured by the lens system 2 and the convex mirror 4 shown in FIG. 1, in addition to a curvature of field and a distortion. By adding the first lens group 12*a* of the first embodiment, a residual aberration in the synthesizing optical system which includes the second lens group 12*b* and the convex mirror 14 can be canceled and it is easy to secure better optical properties than those in the projection optical system of the comparison example. Thus, the convex mirror 14 which is large in size and requires high cost can be further reduced in size. Therefore, a position of a top light ray (on a side of the screen 15) of the light flux after the emission from the lens system 12 to the incidence on the convex mirror 14 shifts downward (in a direction away from the screen 15), thereby the plane mirror 13 decreases in size and the image display apparatus in which the height H1 of the lower part is smaller can be realized.

Figure 13:
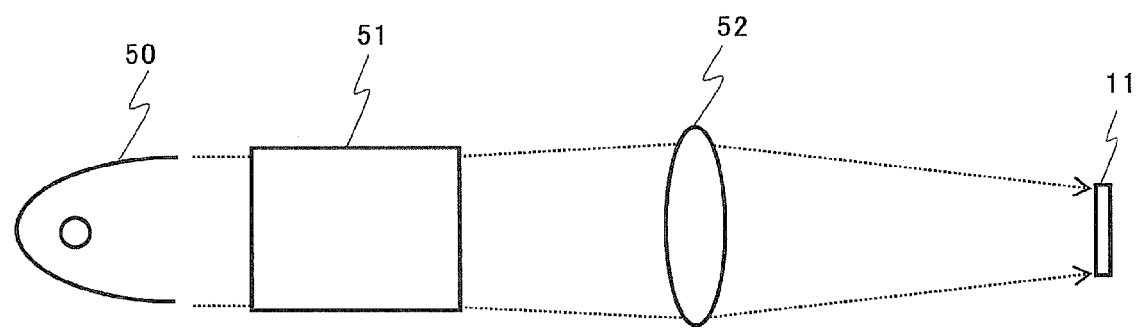
FIG. 13 is a diagram illustrating an example of an illuminator irradiating the projection optical system with a light.

Next, an illuminator irradiating the image display panel 11 with a light flux will be described which is needed when an image display apparatus is configured through the use of the projection optical system 10 according to the first embodiment. FIG. 13 is a diagram illustrating an example of a structure of the illuminator irradiating the projection optical system 10 with a light. As shown in FIG. 13, the illuminator includes a light source 50, a light-flux uniformizing and forming element 51 and an illuminating optical system 52. A light flux which has been emitted from the light source 50 enters the light-flux uniformizing and forming element 51. At this element 51, a light intensity distribution being unique to the light source is uniformized, and a sectional area of the light flux is shaped in a rectangular shape which is similar to the image display panel 11 and then emitted. The illuminating optical system 52 efficiently irradiates a uniformized and shaped light flux as an irradiation light in a substantially rectangular shape which is similar to the display surface of the image display panel 11. The irradiation light with which the image display panel is irradiated is modulated by the image display panel 11, passes through the lens 12, the plane mirror 13 and the convex mirror 14, and is projected onto the screen 15.

As the light source 50, such as a super high pressure mercury vapor lamp, a xenon lamp, a light emitting diode (LED), or a semiconductor laser can be used. When a monochromatic light source such as an LED or a laser is used as the light source 50, in order to obtain a white light source, it is effective to add a synthesizing optical system which synthesizes monochromatic light sources and uses such as a dichroic mirror. When a laser is used as the light source, F-number of the optical system can be made larger with brightness kept, because of its high directivity. Thus, because it is easy to secure desirable optical properties, the lens system and the convex mirror 14 can be reduced in size and a thinner image display apparatus in which the height H1 of the lower part is small can be realized.

As the light-flux uniformizing and forming element 41, a couple of fly-eye lenses including segmented lenses which are two-dimensionally disposed, a hollow light pipe using internal multiple reflections and having a rectangular sectional shape, a glass rod using total reflection at an interface between glass and air and having a rectangular sectional shape, or the like can be used.

The illuminating optical system 52 can be configured by an arbitrary combination of a lens, a mirror and the like. In the case of a single-chip projector for time-division displaying RGB, such as a color wheel can be used for time-division switching a white light source in accordance with an image signal.

As described above, the projection optical system 10 according to the first embodiment can provide the thin image display apparatus in which the height H1 of the lower part of the apparatus below the screen is sufficiently small.

Second Embodiment

Figure 14:
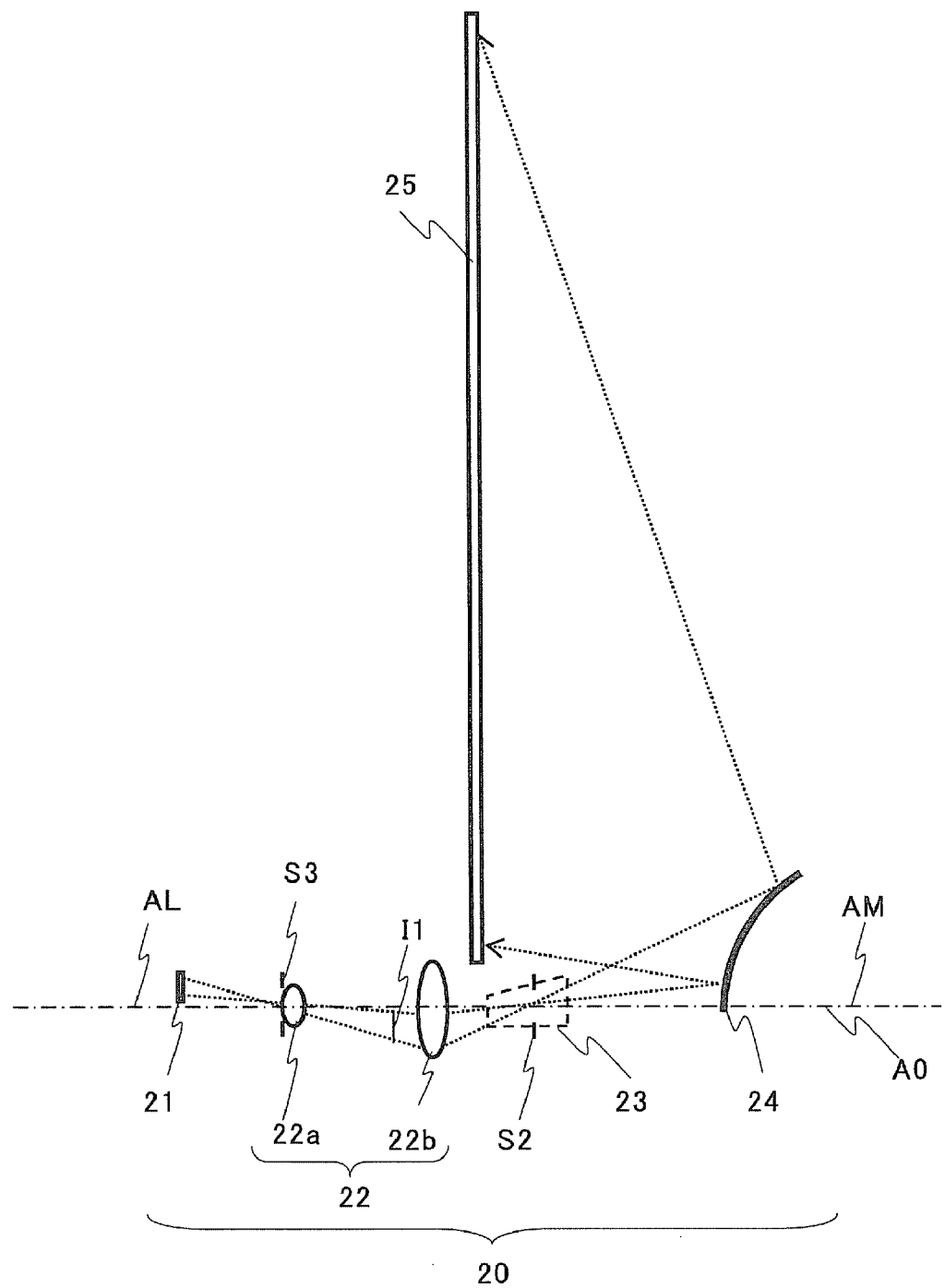
FIG. 14 is a diagram schematically illustrating an example of an internal structure of an image display apparatus according to a second embodiment of the present invention (an internal structure in a case where it is assumed that no plane mirror is provided)
Figure 15:
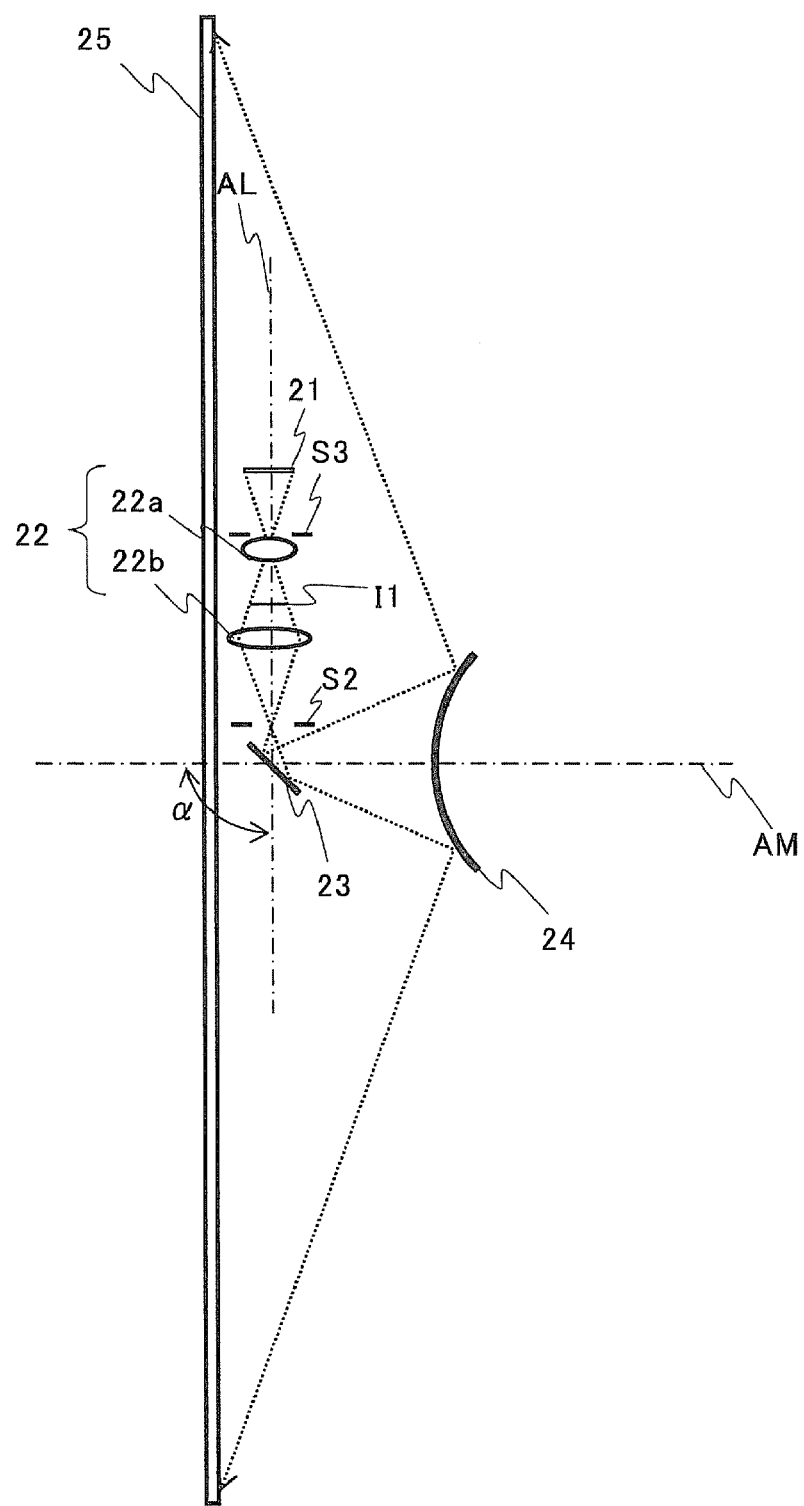
FIG. 15 is a plan view schematically illustrating an example of the internal structure of the image display apparatus according to the second embodiment (an internal structure in a case where a plane mirror is provided)

FIG. 14 is a diagram schematically illustrating an example of an internal structure of an image display apparatus according to the second embodiment of the present invention (an internal structure in a case where it is assumed that no plane mirror is provided). FIG. 15 is a plan view schematically illustrating an example of an internal structure of the image display apparatus according to the second embodiment. An image display panel 21, a lens system 22 (lens groups 22*a*, 22*b*), a plane mirror 23, a convex mirror 24 and a screen 25 in FIG. 14 and FIG. 15 correspond to the image display panel 11, the lens system 12 (the lens groups 12*a*, 12*b*), the plane mirror 13, the convex mirror 14 and the screen 15 in FIG. 5 and FIG. 6, respectively. A projection optical system 20 according to the second embodiment differs from that of the first embodiment in a point that: a stop S3 in the lens system (lens-system-stop) is disposed nearest to the image display panel 21 in the lens system 22, that is, a side of the image display panel 21 is non-telecentric. FIG. 14 illustrates an arrangement of the plane mirror 23 by a broken line and an arrangement of the lens system 22 and the convex mirror 24 in the case where it is assumed that the plane mirror 23 is not provided, that is, in the case of a linear arrangement. However, an actual structure of the projection optical system 20 includes the plane mirror 23, as shown in FIG. 15.

Next, an image formation relationship in the projection optical system 20 will be described. Regarding the first lens group 22a, the image display panel 21 and an intermediate image I1 are in a conjugate relationship. Regarding a synthesizing optical system which includes the first lens group 22a and the second lens group 22b, the lens-system-stop S3 and a stop S2 are in a conjugate relationship. Regarding a synthesizing optical system which includes the second lens group 22b and the convex mirror 24, the intermediate image I1 and the screen 25 are in a conjugate relationship. Regarding the whole projection optical system which includes the lens system 22 and the convex mirror 24, the image display panel 21 and the screen 25 are in a conjugate relationship. The convex mirror 24 is configured so that an image of the image display panel 21 is formed on a surface of the screen 25 by the lens system 22 as a virtual object.

Next, states of convergence and divergence of a light flux in the projection optical system 20 will be described. Each of the first lens group 22a and the second lens group 22b includes a plurality of lenses and has a positive power as a whole. A light flux emitted from the image display panel 21 converges by the lens-system-stop S3, enters the first lens group 22a, is emitted from the first lens group 22a in a divergent state, and forms the intermediate image I1. The divergent light flux which has formed the intermediate image I1 enters the second lens group 22b, converges again at the stop S2 by the second lens group 22b, then diverges, and enters the convex mirror 24. The divergent light flux which has entered the convex mirror 24 further diverges by the convex mirror 24 (a divergent angle increases) and impinges on the screen 25.

The light flux after the emission from the lens system 22 to the incidence on the convex mirror 24 is the same as that in the first embodiment in a point that the light flux once converges most at the stop S2. For this reason, by arranging near the stop S2 the plane mirror 23 for bending an optical path after the emission from the lens system 22 to the incidence on the convex mirror 24 in a horizontal direction, a size of the plane mirror 23 can be reduced in vertical and horizontal directions. Therefore, a light ray which travels from the convex mirror 24 to a bottom end of an image display area of the screen 25 does not interfere with the plane mirror 23, the plane mirror 23 does not protrude ahead of the screen 25, an upward shift amount of the screen 25 from an optical axis A0 can be reduced and the image display apparatus in which a height of a lower part of the apparatus is small can be realized.

Because the projection optical system 20 according to the second embodiment is a non-telecentric system that the lens-system-stop S3 is disposed on a side of a position nearest to the image display panel 21 in the lens system 22, a diameter of a light flux which enters the first lens group 22a is small and the first lens group 22a can be reduced in size. Accordingly, an image display apparatus which can prevent an unnecessary light produced by such as an illuminating optical system from entering the lens system 22 and can display a high-contrast image with less ghost image and less stray light can be realized.

In a telecentric system, it is required that a light flux from the image display panel 21 converges at the lens-system-stop S3 by the first lens group 22a. In a non-telecentric system, on the other hand, the light flux from the image display panel 21 directly converges at the lens-system-stop S3 before entering the first lens group 22a and the first lens group 22a needs no positive power for converging at the lens-system-stop S3.

Thus, a positive power of the first lens group 22a may be small and an overall length of the lens system 22 can be reduced also. In other words, the lens system 22 can be reduced in size.

As described above, the projection optical system 20 according to the second embodiment can reduce the lens system 22 in size as well as the plane mirror 23, thereby can provide the thin image display apparatus in which the height of the lower part of the apparatus below the screen is sufficiently small.

Although the lens-system-stop S3 is disposed outside of the lens system 22 (closer to the image display panel 21) in the second embodiment, it is not limited to this example and the lens-system-stop S3 can be disposed within the lens system 22.

The second embodiment is the same as the first embodiment except for the points described above.

Third Embodiment

Figure 16:
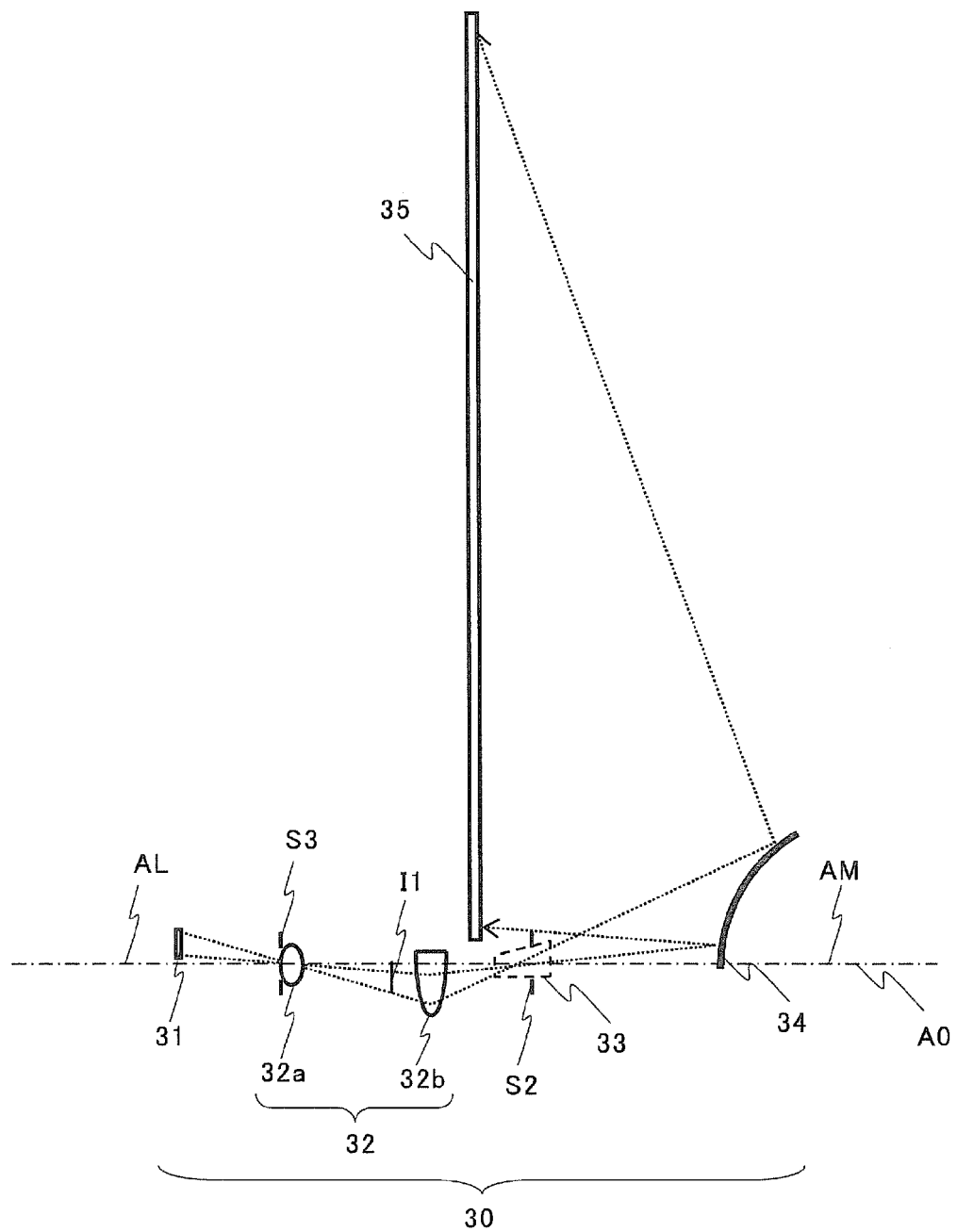
FIG. 16 is a diagram schematically illustrating an example of an internal structure of an image display apparatus according to a third embodiment of the present invention (an internal structure in a case where it is assumed that no plane mirror is provided)
Figure 17:
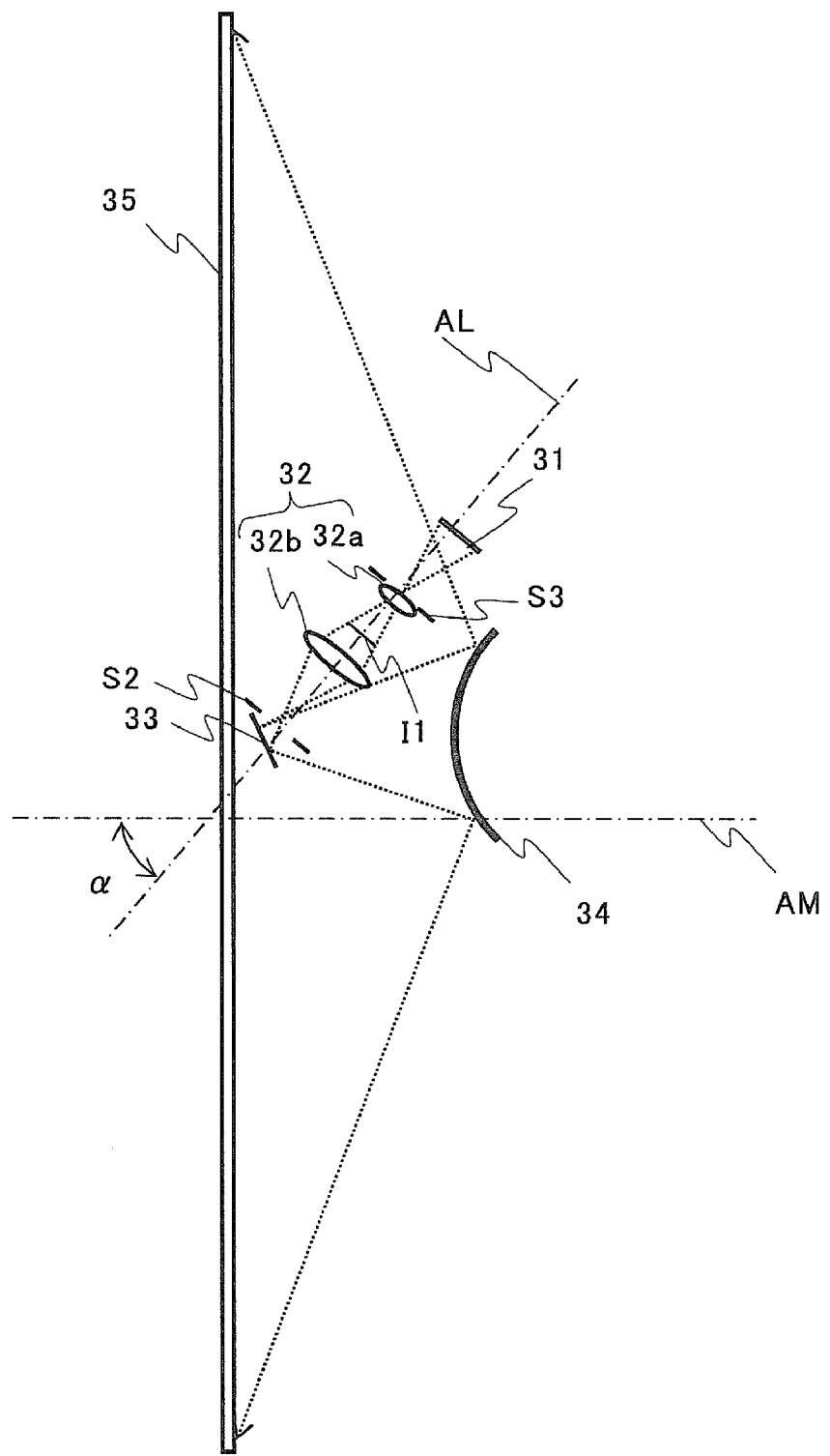
FIG. 17 is a plan view schematically illustrating an example of the internal structure of the image display apparatus according to the third embodiment (an internal structure in a case where a plane mirror is provided)

FIG. 16 is a diagram schematically illustrating an example of an internal structure of an image display apparatus according to a third embodiment of the present invention (an internal structure in a case where it is assumed that a plane mirror 33 is not provided). FIG. 17 is a plan view schematically illustrating an example of the internal structure of the image display apparatus according to the third embodiment (in a case where the plane mirror 33 is provided). An image display panel 31, a lens system 32 (lens groups 32a, 32b), the plane mirror 33, a convex mirror 34 and a screen 35 in FIG. 16 and FIG. 17 correspond to the image display panel 21, the lens system 22 (the lens groups 22a, 22b), the plane mirror 23, the convex mirror 24 and the screen 25 in FIG. 14 and FIG. 15, respectively. In a projection optical system 30 according to the third embodiment, the optical path in the projection optical system 20 according to the second embodiment is bent in a horizontal direction by the plane mirror 33 so that the angle α is an acute angle, thereby a height of a lower part of the image display apparatus is reduced. The elements in the projection optical system 30 function substantially likewise those in the second embodiment. FIG. 16 illustrates an arrangement of the plane mirror 33 by a broken line and an arrangement of the lens system 32 and the convex mirror 34 in the case where it is assumed that the plane mirror 33 is not arranged, that is, in the case of a linear arrangement. However, an actual structure of the projection optical system 30 includes the plane mirror 33, as shown in FIG. 17.

Figure 18:
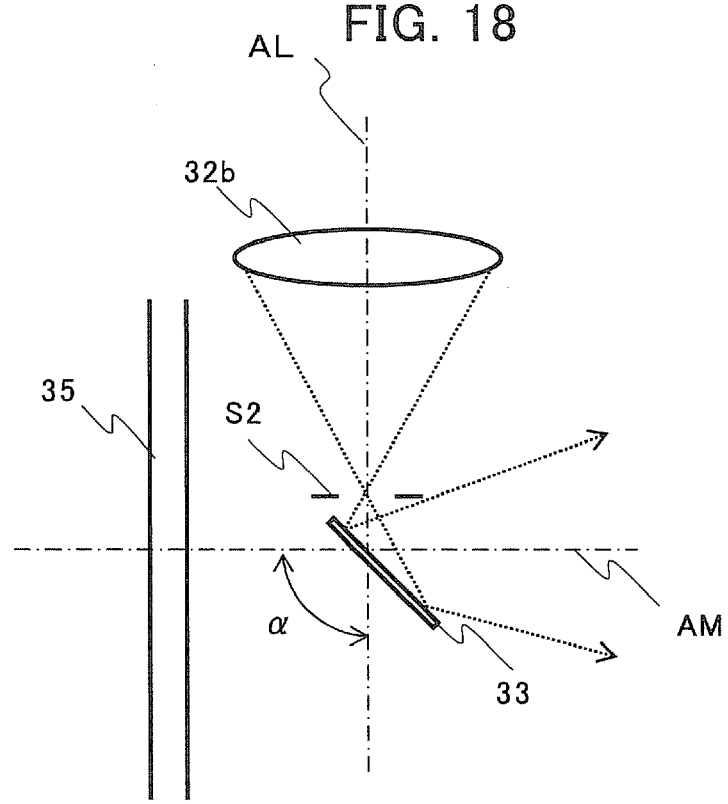
FIG. 18 is a plan view illustrating a plane mirror size when an angle formed by an optical axis of a lens system and an optical axis of a convex mirror is a substantially right angle.
Figure 19:
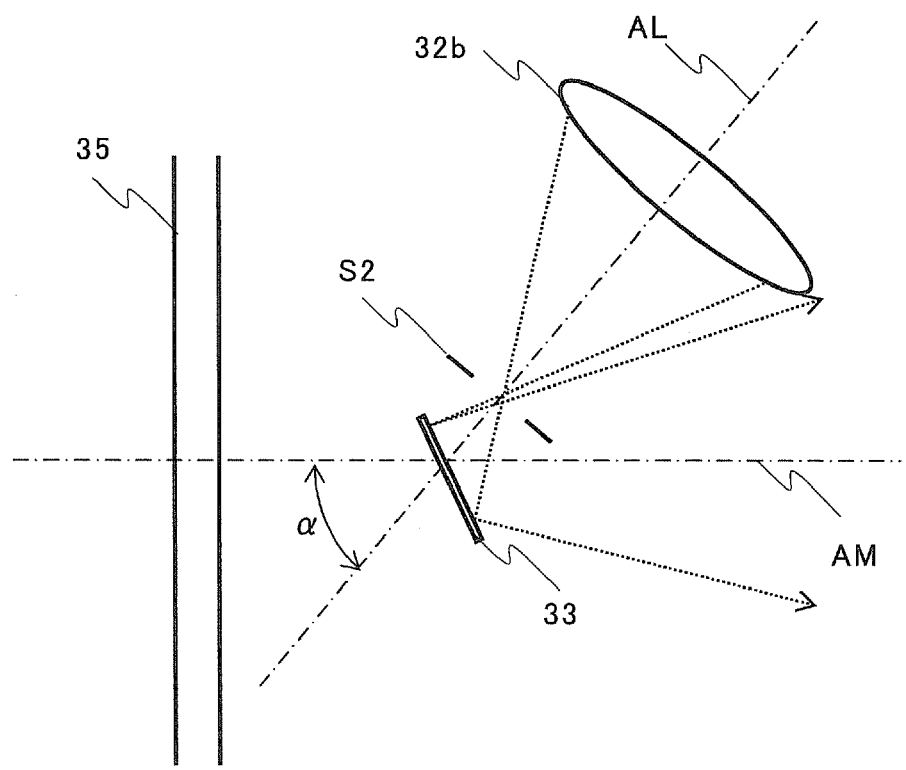
FIG. 19 is a plan view illustrating a plane mirror size when the angle formed by the optical axis of the lens system and the optical axis of the convex mirror is an acute angle.

Next, a principle to reduce the height of the lower part of the image display apparatus will be described. FIG. 18 is a plan view illustrating a plane mirror size when an angle α which is formed by an optical axis AL of the lens system 32 and an optical axis AM of the convex mirror 34 is a substantially right angle, and FIG. 19 is a plan view illustrating a plane mirror size when the angle α which is formed by the optical axis AL of the lens system 32 and the optical axis AM of the convex mirror 34 is an acute angle. Further, FIG. 20 is a side view illustrating the plane mirror size when the angle α is a substantially right angle, and FIG. 21 is a side view illustrating the plane mirror size when the angle α is an acute angle.

Figure 20:
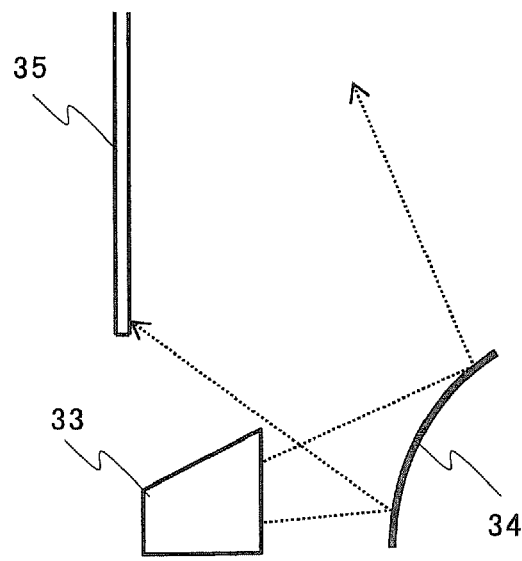
FIG. 20 is a side view illustrating the plane mirror size when the angle formed by the optical axis of the lens system and the optical axis of the convex mirror is a substantially right angle.

As shown in FIG. 18 and FIG. 20, when the angle α is a substantially right angle, the plane mirror 33 which receives a divergent light flux from the stop S2 to reflect the light flux extremely obliquely receives a divergent light (that is, an incident angle of a central ray of the divergent light to the plane mirror 33 increases), and the plane mirror 33 increases in horizontal size and extremely increases in vertical size on a side of the convex mirror 34. Thus, in order to prevent an interference with a light flux which travels from the convex mirror 34 to the screen 35, the screen 35 is inevitably disposed upward and the height of the lower part of the image display apparatus increases.

Figure 21:
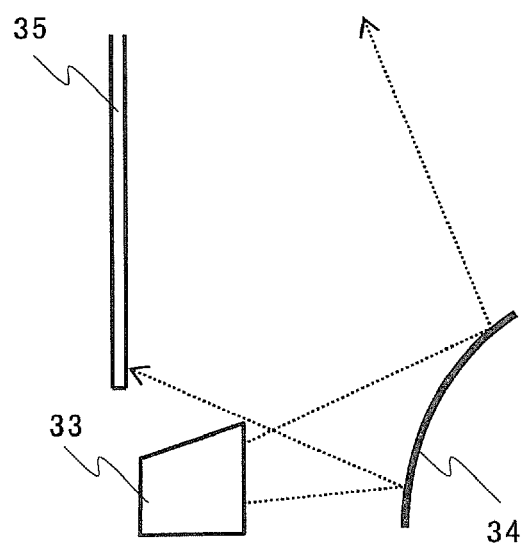
FIG. 21 is a side view illustrating the plane mirror size when the angle formed by the optical axis of the lens system and the optical axis of the convex mirror is an acute angle.

On the other hand, as shown in FIG. 19 and FIG. 21, when the angle α is an acute angle, because the plane mirror 33 receives the divergent light (that is, the incident angle of the central ray of the divergent light to the plane mirror 33 decreases) from a direction closer to a front in comparison with the case where the angle α is a substantially right angle, a size of the plane mirror 33 can be comparatively reduced in horizontal and vertical directions. Thus, it is easy to prevent an interference with the light flux which travels from the convex mirror 34 to the screen 35, the screen 35 can be disposed further downward and the height of the lower part of the image display apparatus can be reduced. The angle α is desirably within a range of $20° \leq \alpha \leq 90°$. The reason why the range is desirable is as follows: if the angle α is smaller than 20°, the light flux interferes with the convex mirror 34, the lens system 32, the image display panel 31 or the like, and if the angle α is larger than 90°, the lens system 32 or the image display panel 31 protrudes ahead of the screen 35.

As has been described in the second embodiment, in the case of a non-telecentric system, the first lens group 32a can be sufficiently reduced in size but the second lens group 32b is difficult to be made small as the first lens group 32a, because the second lens group 32b receives the divergent light flux from the first lens group 32a. Moreover, if the angle α is an acute angle, as shown in FIG. 17, the lens system 32 is disposed closer to the convex mirror 34 and accordingly a light flux which passes above the lens system 32 (closer to the screen 35) and travels from the convex mirror 34 to a bottom end of an image display area of the screen 35 is further lowered. For this reason, if the screen 35 is disposed considerably downward (in a direction away from the screen 35) accompanying reducing the plane mirror 33 in size, there is a possibility that the second lens group 32b interferes with the light flux which travels from the convex mirror 34 to the bottom end of the image display area of the screen 35.

On the other hand, as can be understood from FIG. 16, the light flux mainly passes a lower part of the second lens group 32b and an upper part has no actual function and thus the upper part of the second lens group 32b (closer to the screen 35) is cut off. Thereby, even if the angle α is an acute angle, the height of the lower part of the image display apparatus can be reduced without an interference of the light flux and the lens group. The second lens group 32b includes a plurality of lenses and only a lens which interferes with the light flux can be a lens which is partly cut off.

As described above, the projection optical system 30 according to the third embodiment can reduce the lens system 32 in size as well as the plane mirror 33, thereby can provide a thin image display apparatus in which the height of the lower part of the apparatus below the screen is sufficiently small.

Although the lens-system-stop S3 is disposed outside of the lens system 32 (on a side of the image display panel 31) in this embodiment, it is not limited to this example and the lens-system-stop S3 can be disposed within the lens system 32.

Furthermore, the third embodiment is the same as the first or second embodiments except for the points described above.

Fourth Embodiment

Figure 22:
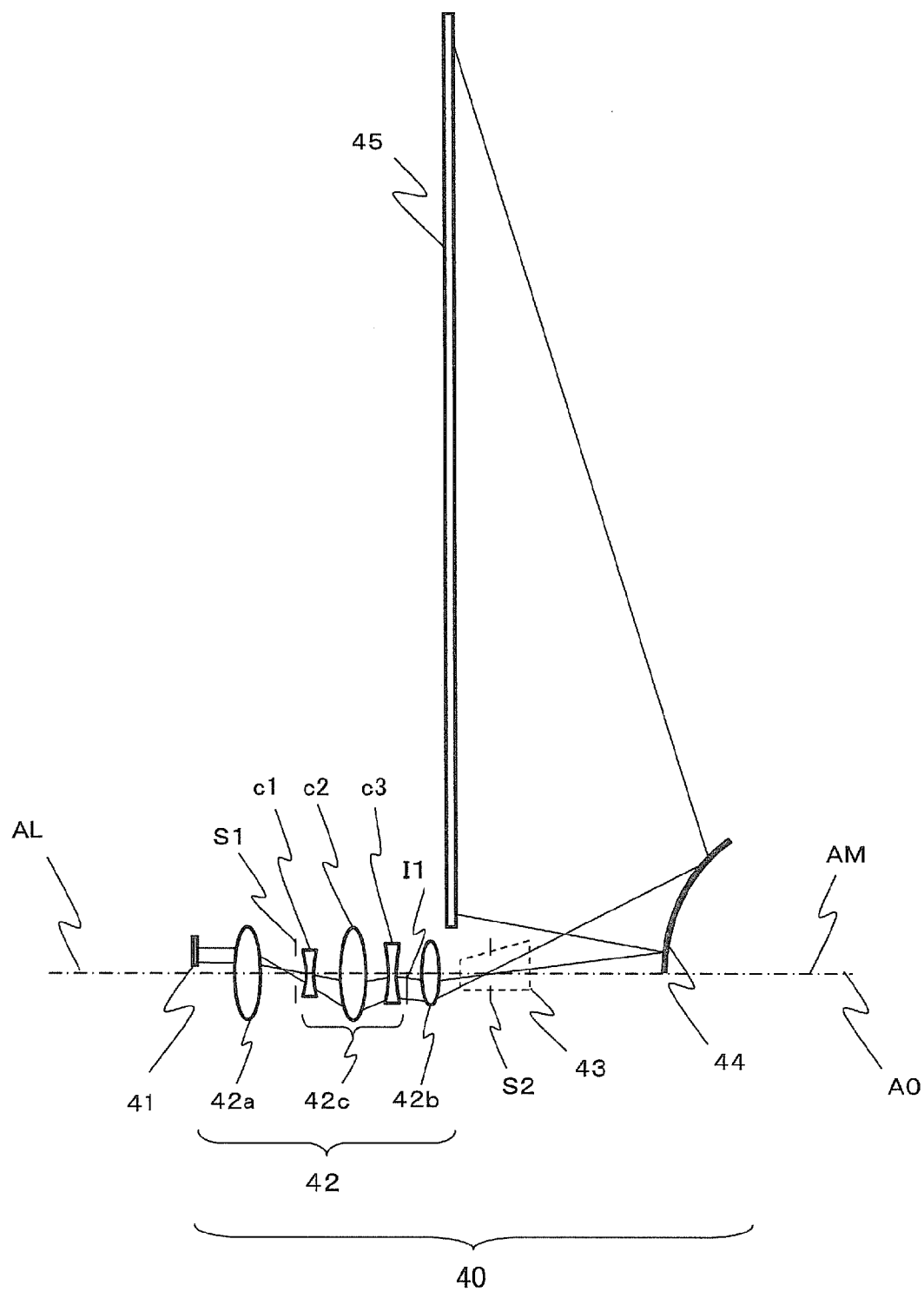
FIG. 22 is a diagram schematically illustrating an example of an internal structure of an image display apparatus according to a fourth embodiment of the present invention (an internal structure in a case where it is assumed that no plane mirror is provided)
Figure 23:
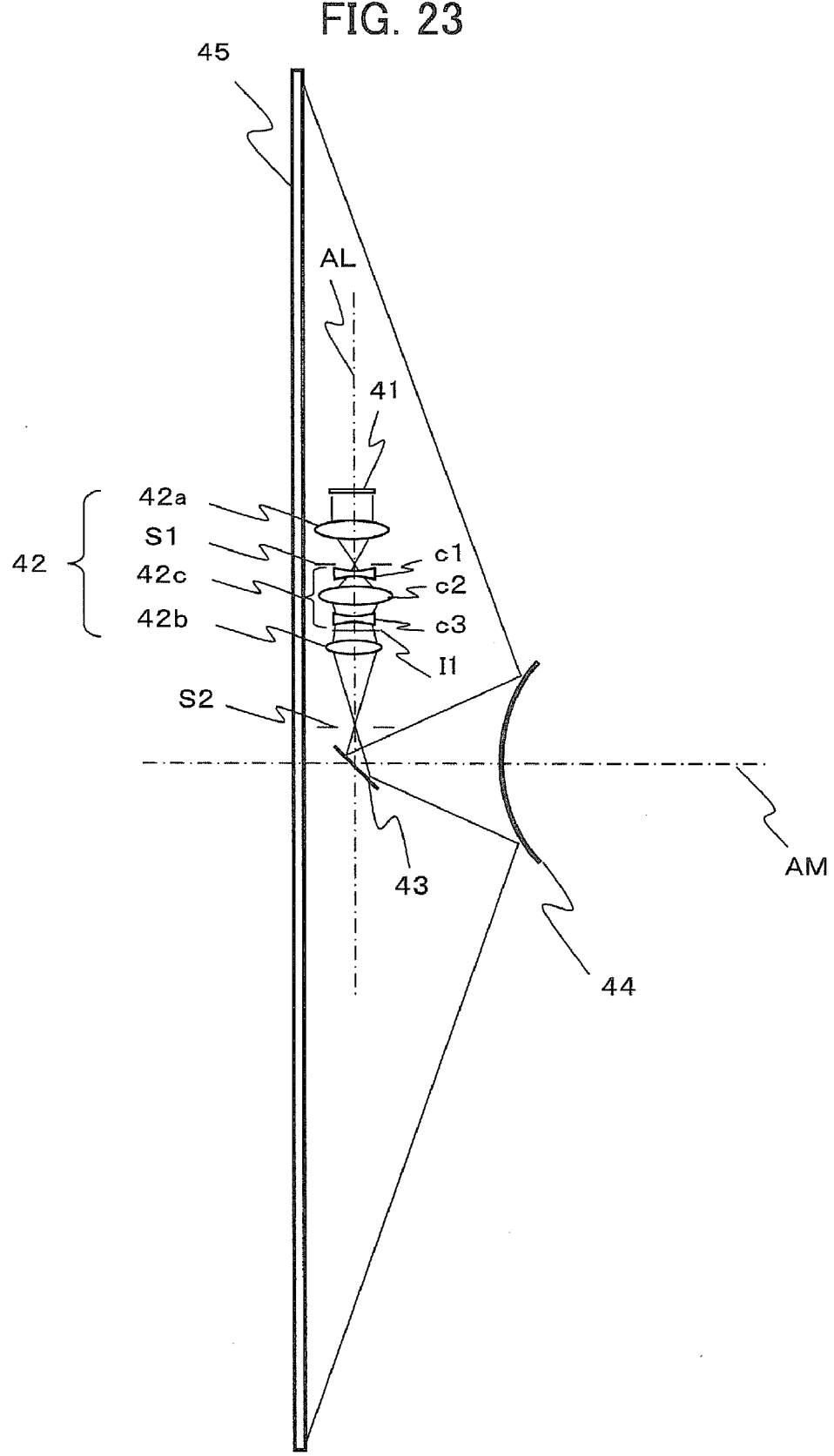
FIG. 23 is a plan view schematically illustrating an example of the internal structure of the image display apparatus according to the forth embodiment (an internal structure in a case where a plane mirror is provided)

FIG. 22 is a diagram schematically illustrating an example of an internal structure of an image display apparatus according to a fourth embodiment of the present invention (an internal structure in a case where it is assumed that a plane mirror 43 is not provided). FIG. 23 is a plan view schematically illustrating an example of the internal structure of the image display apparatus according to the fourth embodiment (in a case where the plane mirror 43 is provided). An image display panel 41, a lens system 42 (lens groups 42a, 42b and 42c), the plane mirror 43, a convex mirror 44 and a screen 45 in FIG. 22 and FIG. 23 correspond to the image display panel 11, the lens system 12 (the lens groups 12a, 12b), the plane mirror 13, the convex mirror 14 and the screen 15 in FIG. 5 and FIG. 6, respectively. A projection optical system 40 according to the fourth embodiment differs from that of the first embodiment in a point that: the third lens group 42c is disposed between a lens-system-stop S1 and an intermediate image I1. Furthermore, FIG. 22 illustrates an arrangement of the plane mirror 43 by a broken line and an arrangement of the lens system 42 and the convex mirror 44 in the case where it is assumed that the plane mirror 43 is not provided, that is, in the case of a linear arrangement. However, an actual structure of the projection optical system 40 includes the plane mirror 43, as shown in FIG. 23.

The elements in the projection optical system 40 function substantially likewise those in the first embodiment, except for the point that the third lens group 42c is disposed between the lens-system-stop S1 and the intermediate image I1, as described above. The third lens group 42c includes, in an order from a side of the stop S1, a lens group c1 having a negative power, a lens group c2 having a positive power, and a lens group c3 having a negative power. Each of the lens groups c1, c2 and c3 includes at least one lens.

Effects to arrange the lens group 42c will be described below, while focusing on an optical system forming the intermediate image I1 from the image display panel 41. If the lens group 42c is not disposed, the lens group 42a having the positive power is disposed only on a side of the image display panel 41 against the lens-system-stop S1, and a curvature of field because of the positive power tends to be large. Here, as a manner to correct the curvature of field, it is effective to arrange a negative power in a position where a light ray is low in height from an optical axis and to arrange a negative power in a position near an image plane. If the lens group 42c is disposed, the lens group c1 having the negative power is disposed in a position where the light ray is low in height from the optical axis, that is, near the lens-system-stop S1, moreover, the lens group c3 having the negative power is disposed in a position near the image plane that is, near the intermediate image I1, thereby there is an effect to correct the curvature of field. If only the lens group c1 having the negative power and the lens group c3 having the negative power, the negative power is too strong and the light flux widely spreads. For this reason, by arranging the lens group c2 having the positive power between the lens group c1 and the lens group c3, the light flux which has spread by the lens group c1 once converges, and the lens group c3 and the following lens group are reduced in size.

First Numerical Example

FIG. 24 illustrates a specific numerical example of a projection optical system 200 according to the second embodiment (a first numerical example). A surface number 'si' denotes a number of an i-th optical surface (i=1, 2, ..., 51), where an optical surface of a smallest side (closest to the image display device) is a first optical surface and the number consecutively increases as closer to an enlarged side (closer to the screen). A radius of curvature 'Ri' indicates a radius of curvature of the optical surface having the surface number si. A surface distance 'Di' indicates a distance from a vertex of the optical surface having the surface number si to a vertex of a subsequent optical surface (surface number si+1). A unit of the radius of curvature Ri and the surface distance Di is millimeter (mm). A refractive index and Abbe number are a refractive index n and Abbe number ν on a d-line of the optical surface having the surface number si (wavelength of 587.56 nm), respectively. A mark '*' attached to the surface number indicates that the surface is aspheric. In a rectangular coordinate system (X, Y, Z) in which a z-axis is an optical axis direction, aspheric surfaces (surface numbers s46, s47, s50) are given by the following equations (3), where 'r' is a paraxial radius of curvature, 'K' is a conic constant, and 'A1, A2, . . . ' are first-order aspheric coefficient, second-order aspheric coefficient, . . . respectively. Aspheric data (the aspheric coefficients A1, A2, . . . , and the conic constant K) are shown in FIG. 25.

$$Z = \frac{h^2/r}{1 + \sqrt{1 - (1+K)\cdot(h^2/r^2)}} + \sum_{i=1} A_i \cdot h^i \quad (3)$$

$$h = \sqrt{X^2 + Y^2}$$

Figure 26:
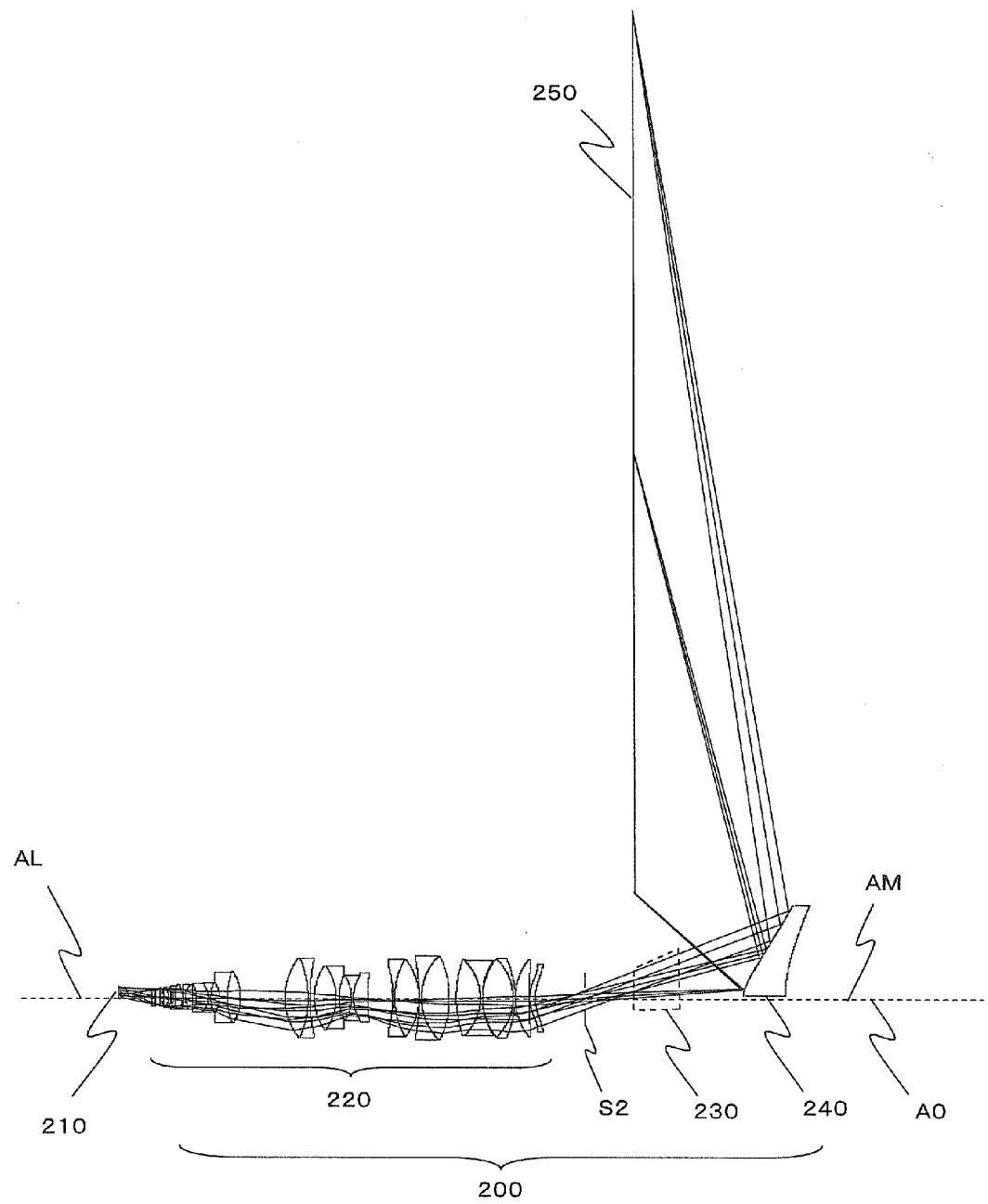
FIG. 26 is a diagram schematically illustrating an example of an internal structure (an internal structure in a case where it is assumed that no plane mirror is provided), when the first numerical example is applied to the projection optical system according to the second embodiment.
Figure 27:
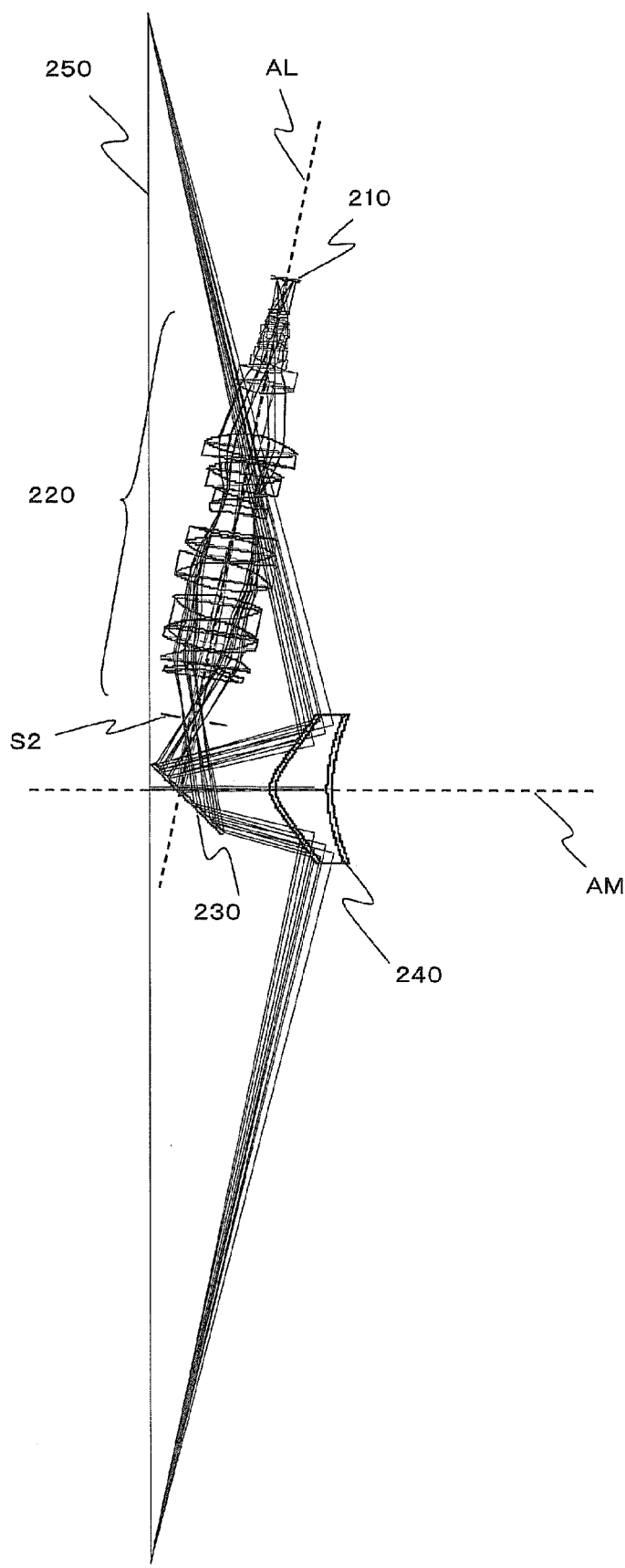
FIG. 27 is a plan view schematically illustrating an example of an internal structure (an internal structure in a case where a plane mirror is provided), when the first numerical example is applied to the projection optical system according to the second embodiment.
Figure 28:
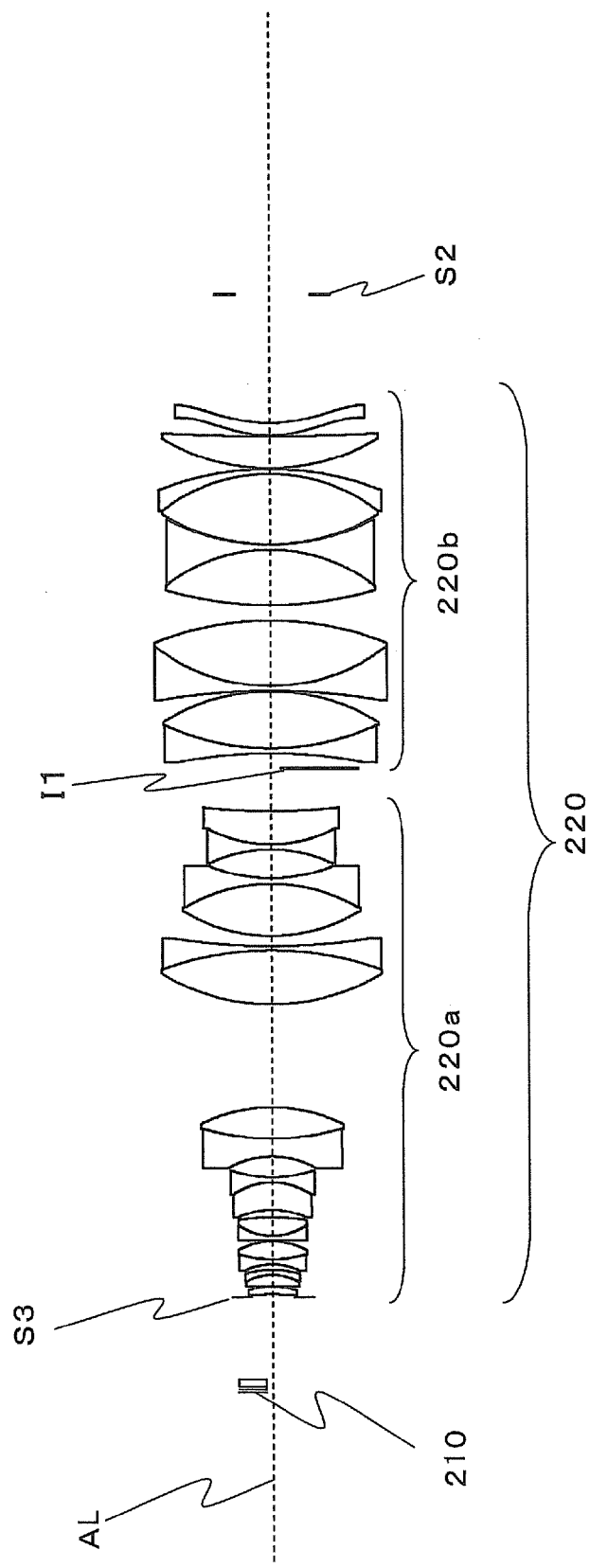
FIG. 28 is a diagram illustrating a lens structure when the first numerical example is applied to the projection optical system according to the second embodiment.

FIG. 26 is a diagram schematically illustrating an internal structure of an image display apparatus which includes the projection optical system 200 corresponding to the first numerical example of FIG. 24 (an internal structure in a case where it is assumed that a plane mirror 230 is not provided). Furthermore, FIG. 27 is a plan view schematically illustrating the internal structure of the image display apparatus which includes the projection optical system 200 (in a case where the plane mirror 230 is provided). Moreover, FIG. 28 is a diagram illustrating a detailed structure of a lens group 220 of the projection optical system 200. An image display panel 210, the lens system 220 (lens groups 220a, 220b), the plane mirror 230, a convex mirror 240 and a screen 250 in FIG. 26, FIG. 27 and FIG. 28 correspond to the image display panel 21, the lens system 22 (the lens groups 22a, 22b), the plane mirror 23, the convex mirror 24 and the screen 25 in FIG. 14 and FIG. 15, respectively. FIG. 26 illustrates an arrangement of the plane mirror 230 by a broken line and an arrangement of the lens system 220 and the convex mirror 240 in the case where it is assumed that the plane mirror 230 is not provided, that is, in the case of a linear arrangement. However, an actual structure of the projection optical system 200 includes the plane mirror 230, as shown in FIG. 27.

A surface s1 corresponds to the image display panel 210, surfaces s2 and s3 correspond to parallel plates, a surface s5 corresponds to the lens-system-stop S3, surfaces s6 to s31 correspond to the lens group 220a, surfaces s32 to s47 correspond to the lens group 220b, a surface s48 corresponds to the stop S2, a surface s49 corresponds to the plane mirror 230, a surface s50 corresponds to the convex mirror, and a surface s51 corresponds to the screen. The plane mirror 230 is disposed with an inclination of 40° to a surface of the screen. An angle formed by an optical axis AL of the lens system 220 and an optical axis AM of the convex mirror 240 is 80°.

In the projection optical system 200 to which the first numerical example is applied, the image display panel 210 has a diagonal dimension of 0.65 inches (aspect ratio 16:9), a screen diagonal dimension of 68.42 inches (1514.7 mm×852.0 mm), and F-number of 2.5. A distance from a bottom end of the screen 250 to the optical axis AM is 101.7 mm. In the formula (1), $L_{11}$ of 41.38 mm and $L_{12}$ of 150.71 mm satisfy the relationship of the formula (1). In the formula (2), where $L_{12}$ is 150.71 mm and p is 99.00 mm, a value 49.5 is obtained on the left side of the formula (2) and a value 198 is obtained on the right side, thereby the relationship of the formula (2) is satisfied.

A focal length of the lens group 220a is 23.6 mm, a focal length of the lens group 220b is 51.8 mm, a focal length of the lens system 220 is −16.4 mm, and a focal length of the whole projection optical system 200 is −1.25 mm.

Figure 29:
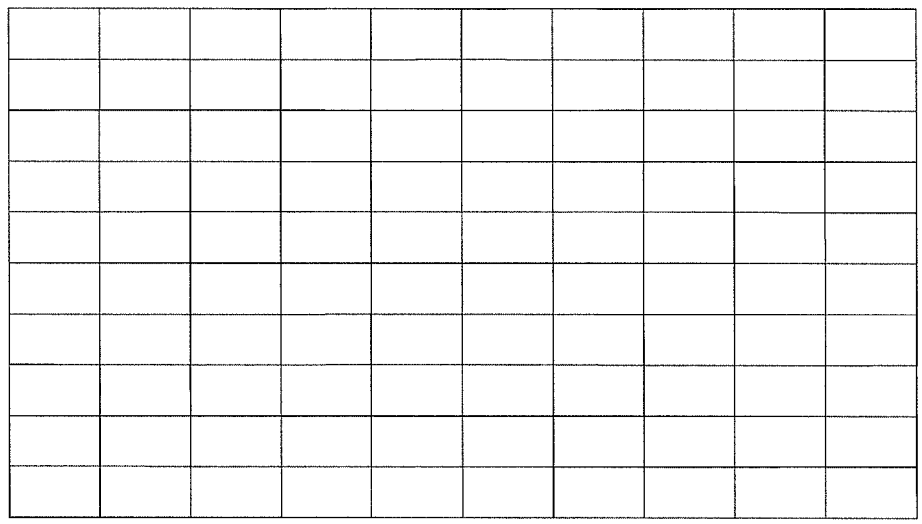
FIG. 29 is a diagram illustrating a distortion when the first numerical example is applied to the projection optical system according to the second embodiment.
Figure 30:
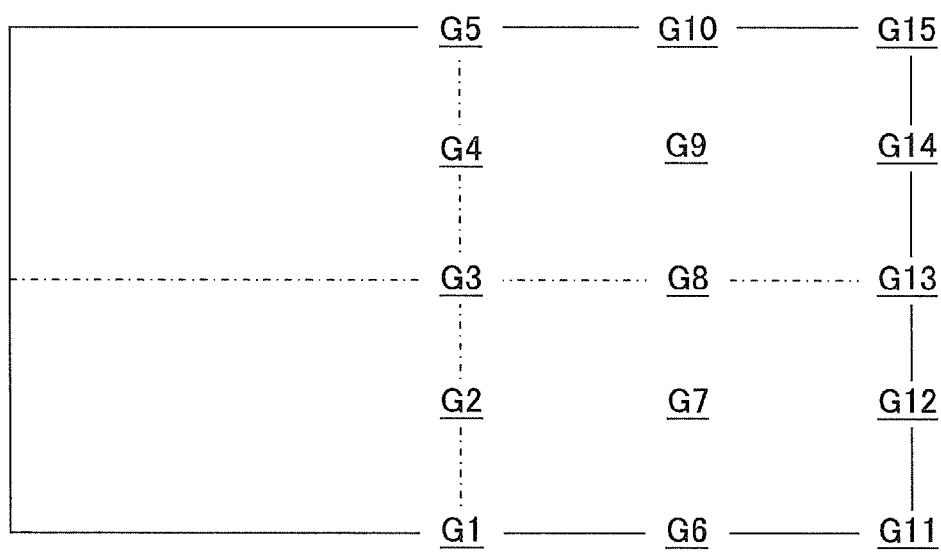
FIG. 30 is a diagram illustrating positions on a screen to indicate spot diagrams when the first numerical example is applied to the projection optical system according to the second embodiment.
Figure 31:
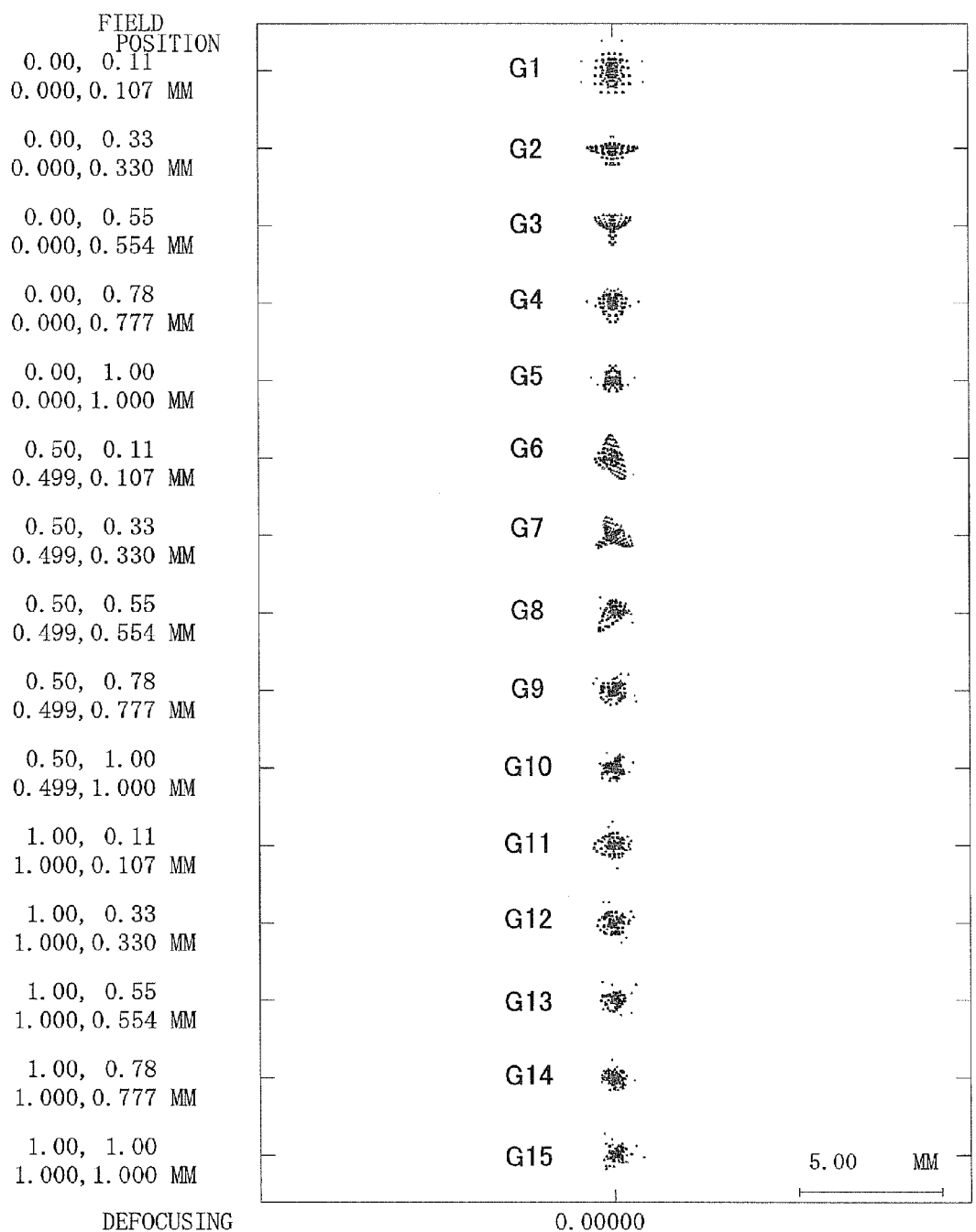
FIG. 31 is a diagram illustrating the spot diagrams when the first numerical example is applied to the projection optical system according to the second embodiment.

FIG. 29 illustrates a distortion in the projection optical system 200 to which the first numerical example is applied. FIG. 30 and FIG. 31 illustrate positions and shapes of spots. FIG. 30 shows positions G1 to G15 on the screen which correspond to reference numerals G1 to G15 in spot diagrams of FIG. 31, respectively. In other words, the spot diagrams of FIG. 31 indicate spot diagrams in the positions G1 to G15 on the screen shown in FIG. 30. Weight of used wavelengths, wavelength 460 nm, wavelength 532 nm and wavelength 640 nm, is 1:6:3, respectively. As shown in FIG. 29, a display image has no striking distortion or the like and a distortion is sufficiently corrected. As shown in FIG. 31, good image-forming properties are obtained and a curvature of field is sufficiently corrected.

Second Numerical Example

FIG. 32 illustrates a specific numerical example of a projection optical system 400 according to the fourth embodiment (second numerical example). A surface number si, a radius of curvature Ri, a surface distance Di, a refractive index n and Abbe number ν, a mark indicating aspheric in FIG. 33 are the same as those in the first numerical example. Aspheric data (the aspheric coefficients A1, A2, . . . , and the conic constant K) are shown in FIG. 32.

Figure 34:
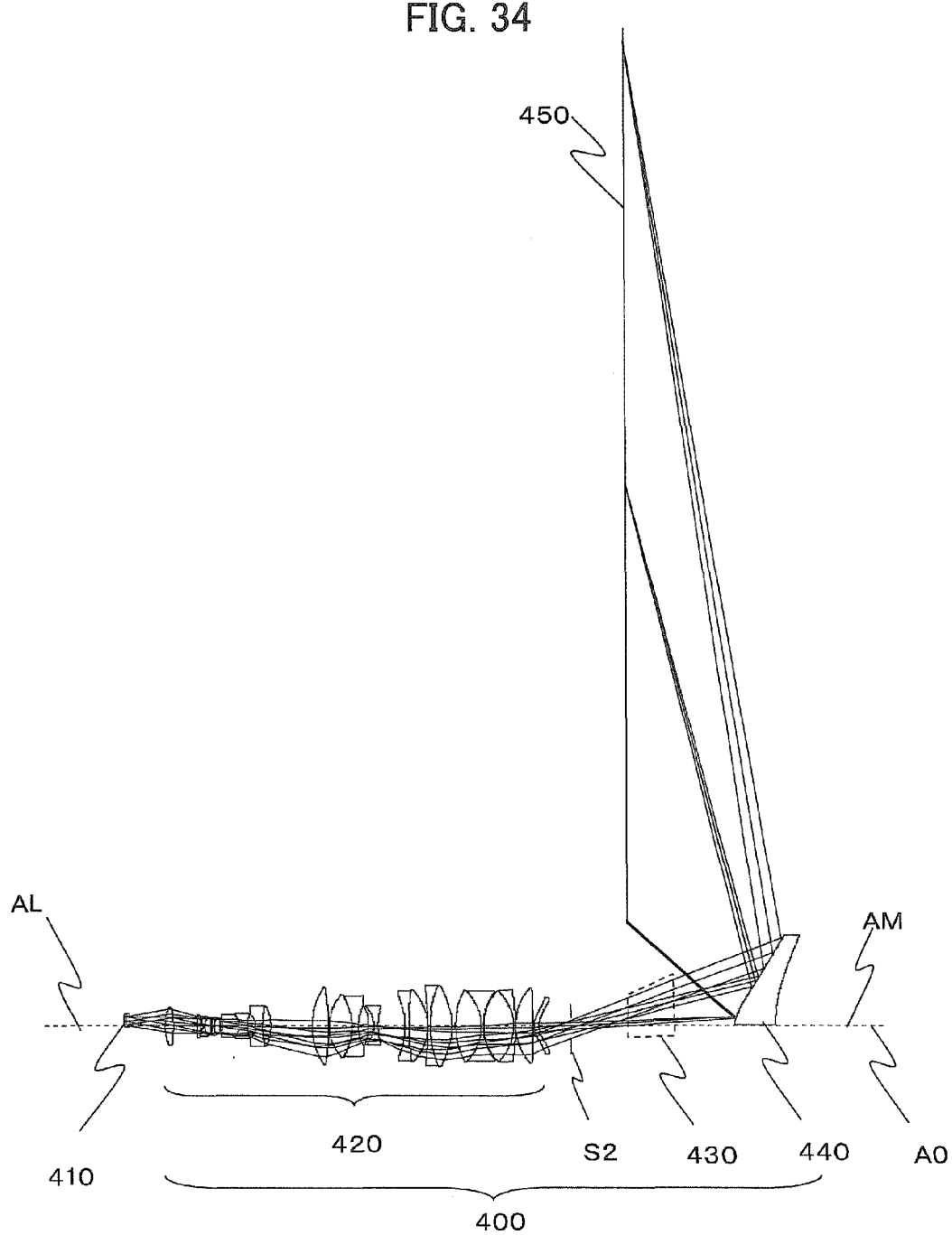
FIG. 34 is a diagram schematically illustrating an example of an internal structure (an internal structure in a case where it is assumed that no plane mirror is provided), when the second numerical example is applied to the projection optical system according to the fourth embodiment.
Figure 35:
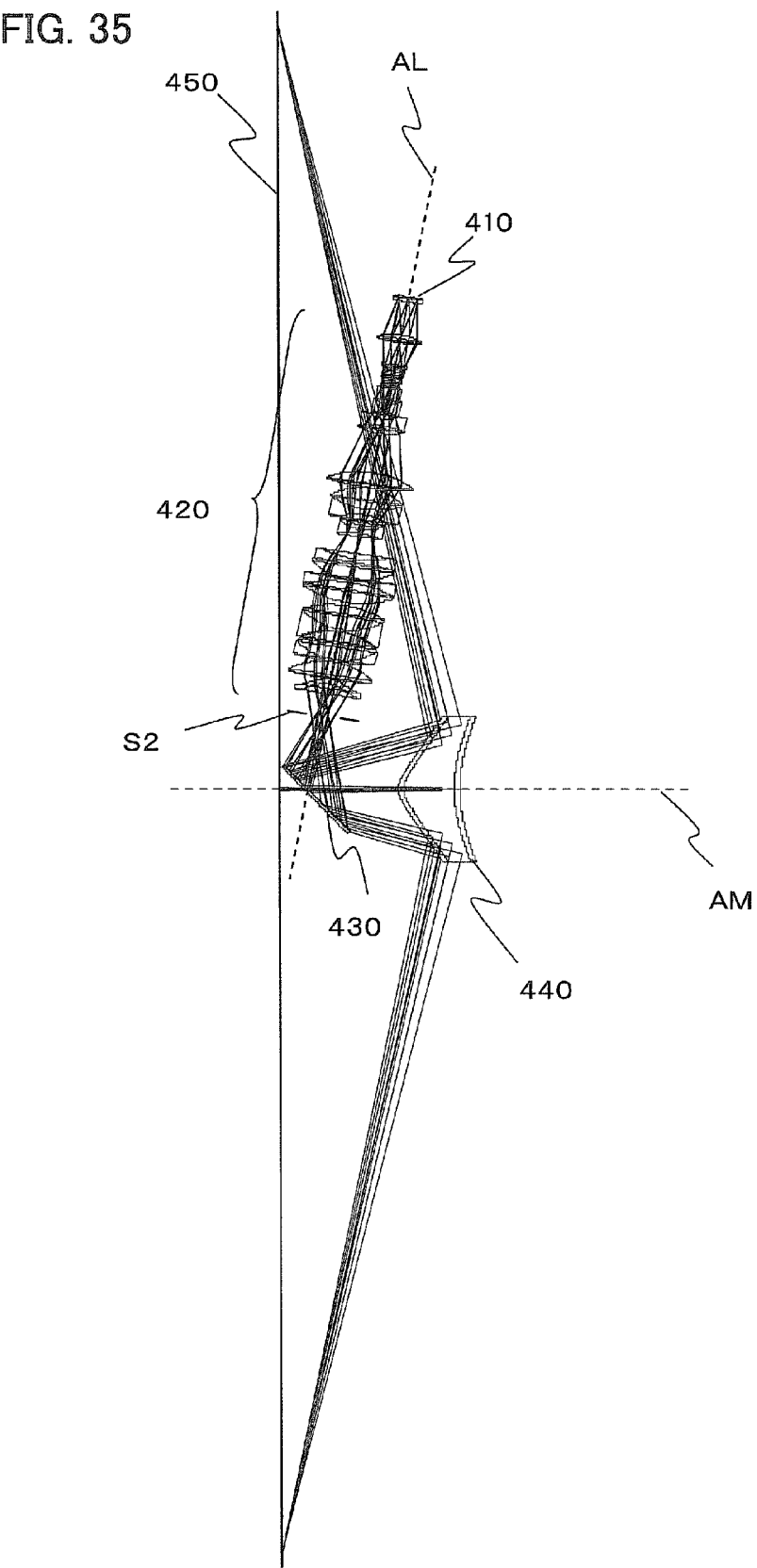
FIG. 35 is a plan view schematically illustrating an example of an internal structure (an internal structure in a case where a plane mirror is provided), when the second numerical example is applied to the projection optical system according to the fourth embodiment.
Figure 36:
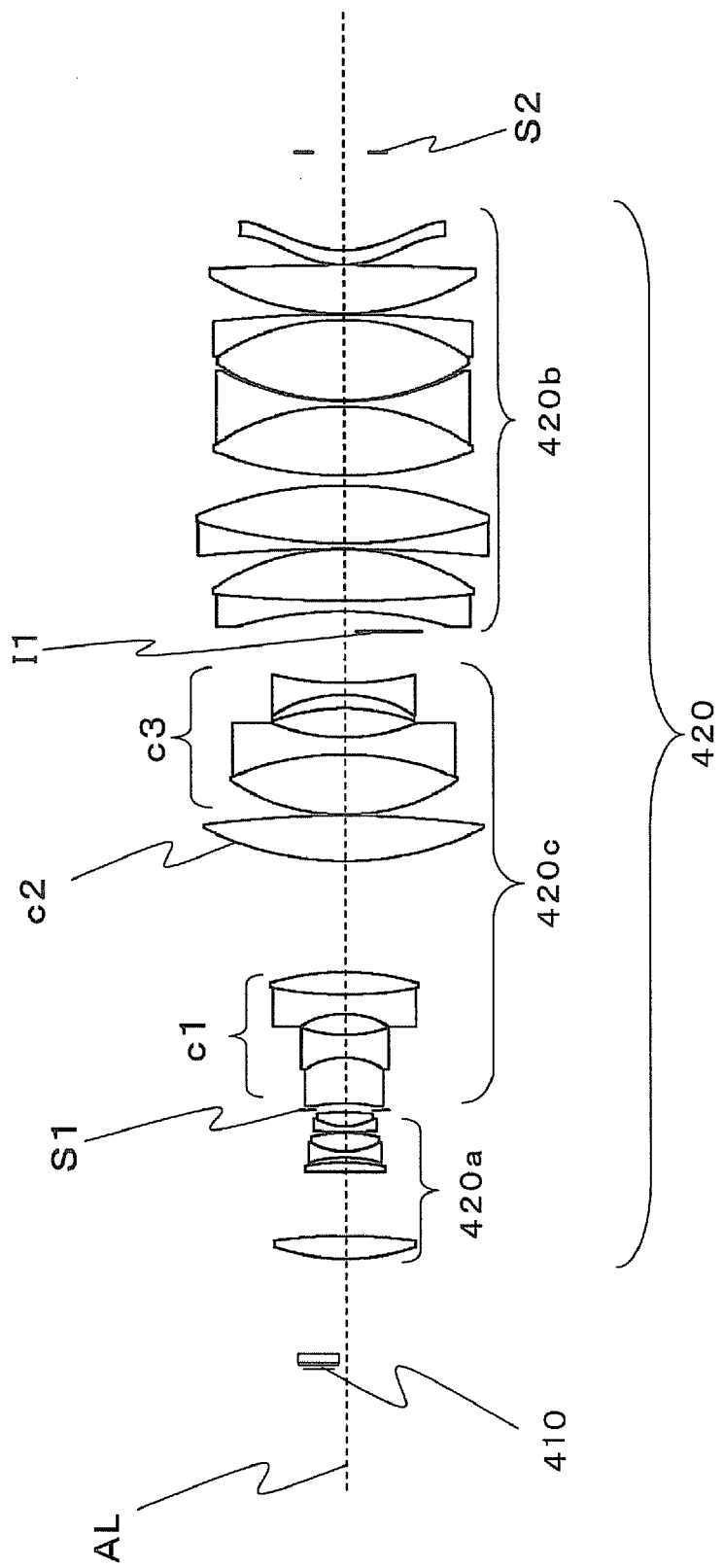
FIG. 36 is a diagram illustrating a lens structure when the second numerical example is applied to the projection optical system according to the fourth embodiment.

FIG. 34 is a diagram schematically illustrating an internal structure of an image display apparatus which includes the projection optical system 400 corresponding to the second numerical example of FIG. 32 (an internal structure in a case where it is assumed that a plane mirror 430 is not provided), and FIG. 35 is a plan view schematically illustrating the internal structure of the image display apparatus including the projection optical system 400 (in a case where the plane mirror 430 is provided). Furthermore, FIG. 36 is a diagram illustrating a detailed structure of a lens system 420 of the projection optical system 400. An image display panel 410, the lens system 420 (lens groups 420a, 420b, 420c), the plane mirror 430, a convex mirror 440 and a screen 450 in FIG. 34, FIG. 35 and FIG. 36 correspond to the image display panel 41, the lens system 42 (the lens groups 42a, 42b, 42c), the plane mirror 43, the convex mirror 44 and the screen 45 in FIG. 22 and FIG. 23, respectively. FIG. 34 illustrates an arrangement of the plane mirror 430 by a broken line and an arrangement of the lens system 420 and the convex mirror 440 in the case where it is assumed that the plane mirror 430 is not provided, that is, in the case of a linear arrangement. However, an actual structure of the projection optical system 400 includes the plane mirror 430, as shown in FIG. 35.

A surface s1 corresponds to the image display panel 410, surfaces s2 and s3 correspond to parallel plates, surfaces s5 to s14 correspond to the lens group 420a, a surface s15 corresponds to the lens-system-stop S1, surfaces s16 to s29 correspond to the lens group 420c (surfaces s16 to s21, s22 to s23 and s24 to s29 correspond to a lens group c1, a lens group c2 and a lens group c3, respectively), surfaces s30 to s46 correspond to the lens group 420b, a surface s47 corresponds to the stop S2, a surface s48 corresponds to the plane mirror 430, a surface s49 corresponds to the convex mirror, and a surface s50 corresponds to the screen. The plane mirror 430 is disposed with an inclination of 40° to a surface of the screen. An angle formed by an optical axis AL of the lens system 420 and an optical axis AM of the convex mirror 440 is 80°.

In the projection optical system 400 to which the second numerical example is applied, the image display panel 410 has a diagonal dimension of 0.65 inches (aspect ratio 16:9), a screen diagonal dimension of 68.42 inches (1514.7 mm×852.0 mm) and F-number of 2.7. A distance from a bottom end of the screen to the optical axis AM is 101.7 mm. In the formula (1), $L_{11}$ of 30.34 mm and $L_{12}$ of 151.40 mm satisfy the relationship of the formula (1). In the formula (2), where $L_{12}$ is 151.40 mm and p is 99.00 mm, a value 49.5 is obtained on the left side of the formula (2) and a value 198 is obtained on the right side, thereby the relationship of the formula (2) is satisfied.

A focal length of the lens group 420a is 36.9 mm, a focal length of the lens group 420b is 45.00 mm, a focal length of the lens group 420c is −42.2 mm (a focal length of the lens group c1 is −33.9 mm, a focal length of the lens group c2 is 64.7 mm and a focal length of the lens group c3 is −42.9 mm), a focal length of the lens system 420 is −17.6 mm, and a focal length of the whole projection optical system 400 is −1.27 mm.

Figure 37:
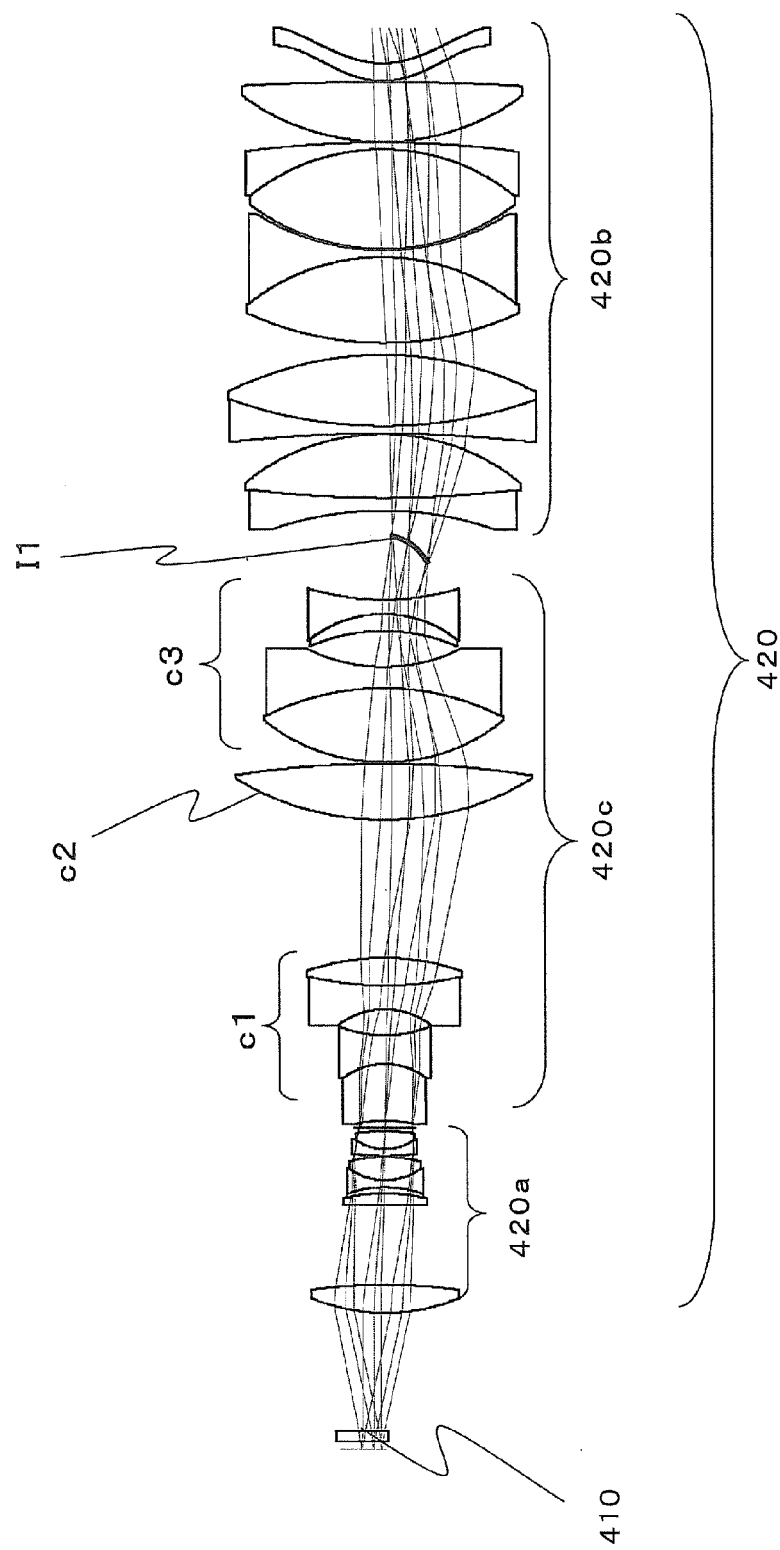
FIG. 37 is a diagram illustrating a state of a curvature of field of an intermediate image when the second numerical example is applied to the projection optical system according to the fourth embodiment.
Figure 38:
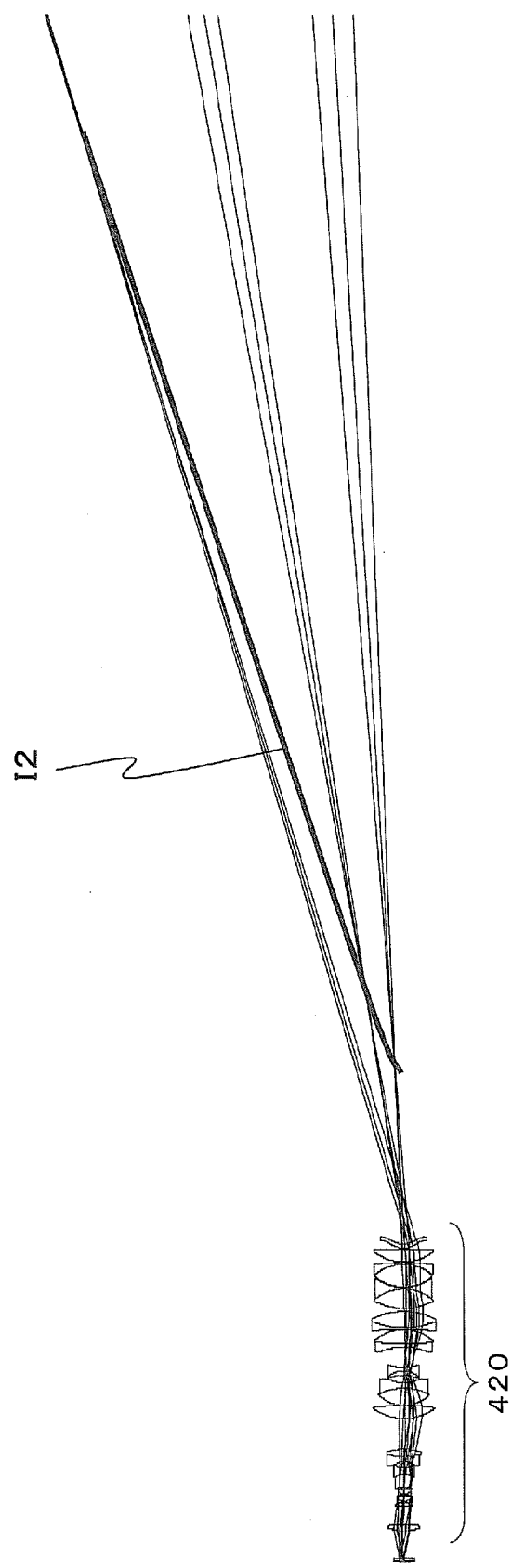
FIG. 38 is a diagram illustrating a state of a curvature of field of an image of an image display panel by a lens group when the second numerical example is applied to the projection optical system according to the fourth embodiment.

Here, correcting a curvature of field in the second numerical example will be described. FIG. 37 illustrates a state of a curvature of field of an intermediate image. The intermediate image I1 is formed between the lens group c3 and the lens group 420b and is curved in a direction away from the lens group 420c as an object height increases. FIG. 38 illustrates a state of a curvature of field of an image I2 of the intermediate image I1 which is formed by the lens group 420b. Usually, if the curved intermediate image I1 is formed by the lens group 420b having a positive power, the image is curved in a direction closer to the lens group 420b as an object height increases. However, in the second numerical example, the image I2 is curved in a direction away from the lens group 420b as an object height increases. Thus, according to the principle described in relation to FIG. 10, the curvature of field caused by the convex mirror can be canceled. It is effective to use an aspheric lens for providing the lens group 420b with a function to correct such a curvature of field. Although an aspheric lens is disposed closest to the convex mirror in the lens group 420b in order to reduce an effective aperture of the lens in the second numerical example, the position of the aspheric lens is not limited to this example and the aspheric lens can be disposed in any position in the lens group 420. The curvature of field can be corrected by arranging the aspheric lens in the lens group 420a or the lens group 420c, not limited to in the lens group 420b.

The correction of a curvature of field described above can be applied to the first numerical example. In FIG. 24, a focal length between the surfaces s17 and s22 is −38.2 mm and corresponds to the lens group c1 described above. Similarly, a focal length between the surfaces s23 to s25 is 89.4 mm and corresponds to the lens group c2 described above. A focal length between the surface s26 to s31 is −58.0 mm and corresponds to the lens group c3 described above. A curvature of field can be corrected also in the first numerical example by adding such structure to the lens group 220. An application of the aspheric lens can be also applied to the first numerical example.

Figure 39:
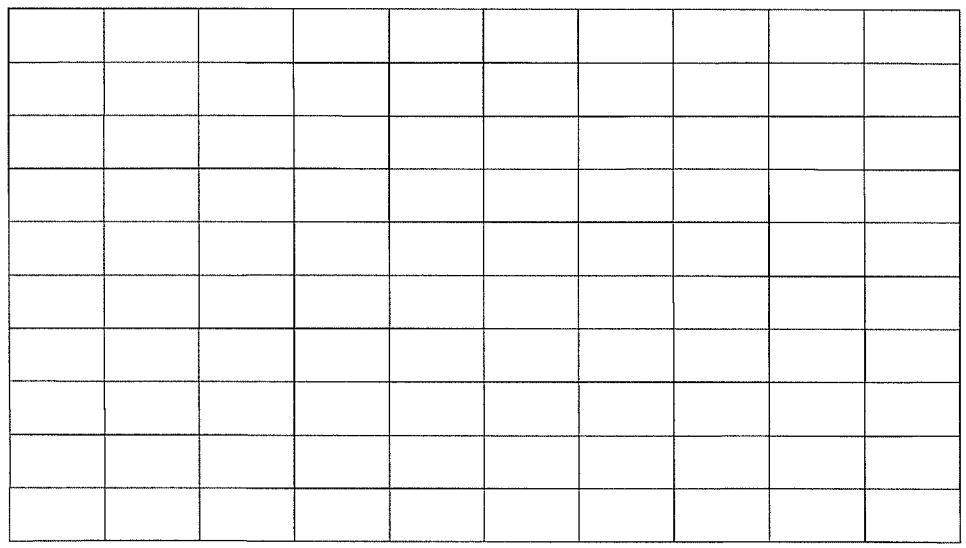
FIG. 39 is a diagram illustrating a distortion when the second numerical example is applied to the projection optical system according to the fourth embodiment.

FIG. 39 illustrates a distortion of the projection optical system 200 to which the second numerical example. Furthermore, FIG. 40 illustrates spot diagrams. The spot diagrams of FIG. 40 are spot diagrams in the positions G1 to G15 on the screen shown in FIG. 30. Weight of used wavelengths, wavelength 460 nm, wavelength 532 nm and wavelength 640 nm, is 1:6:3, respectively. As shown in FIG. 39, a display image has no striking distortion or the like and distortion is sufficiently corrected. As shown in FIG. 40, good image-forming properties are obtained and a curvature of field is sufficiently corrected.

The first and second numerical examples are only design examples, the projection optical system of the present invention is not limited to these numerical examples and various modifications can be made. For example, a image display panel size, a screen size, F-number and a height from the bottom end of the screen to the optical axis can be arbitrarily varied in accordance with specifications and lens configurations of the lens groups (such as the number of lens, glass material, a radius of curvature and a thickness of a lens) in the projection optical system are also variable in design.

Modified Examples

Although each of the first to fourth embodiments describes a single-chip projection optical system using the single image display panel 11, 21, 31 or 41, the present invention is not limited to these examples and can be applied to a three-chip projection optical system using separate image display panels for RGB.

Further, although each of the first to fourth embodiments describes that the convex mirror 14, 24, 34 or 44 has a higher-order aspheric shape, the shape of the convex mirror 14, 24, 34 or 44 is not limited to these examples and a free curved surface is also available in order to further improve design flexibility.

Moreover, although each of the first to fourth embodiments describes that the lens system 12, 22, 32 or 42 and the convex mirror 14, 24, 34 or 44 are coaxial optical systems, the present invention is not limited to these examples and can be applied to a decentration optical system in which the optical axis AL of the lens system 12, 22, 32 or 42 and the optical axis AM of the convex mirror 14, 24, 34 or 44 are not the same in order to further improve design flexibility.

Furthermore, although each of the first to fourth embodiments describes a rear projection type image display apparatus for projecting an image from a rear of the screen 15, 25, 35 or 45, the present invention is not limited to these examples and can be applied to a front projection type image display apparatus.

Although each of the first to fourth embodiments describes that the plane mirror 13, 23, 33 or 43 is disposed in an optical path after an emission from the lens system 12, 22, 32 or 42 to an incidence on the convex mirror 14, 24, 34 or 44, the present invention is not limited to these examples and can be applied to an image display apparatus which does not include the plane mirror 13, 23, 33 or 43.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A projection optical system for enlarging and projecting a light flux from an image display panel modulating an irradiation light, onto a screen in an oblique direction, the projection optical system comprising:

a lens system including a plurality of lenses, the lens system refracting the light flux from the image display panel; and a single convex mirror reflecting the light flux from the lens system, the lens system and the convex mirror being arranged in an order from the image display panel, such that no additional lenses are arranged between the lens system and the convex mirror;

wherein:

the lens system emits the light flux in a state of convergence, and the light flux in a state of convergence once converges in an optical path after an emission from the lens system to an incidence on the convex mirror, and then the light flux in a state of divergence enters the convex mirror, and a light reflection surface of the convex mirror is an aspheric or free curved surface.

2. The projection optical system according to claim 1, further comprising a plane mirror disposed in the optical path after the emission from the lens system to the incidence on the convex mirror.

3. The projection optical system according to claim 1, wherein:
the image display panel is disposed on an opposite side from a part where the intermediate image is formed with respect to an optical axis of the lens system.

4. The projection optical system according to claim 1, wherein:
the lens system is configured to produce a curvature of field which cancels a curvature of field produced by the convex mirror.

5. The projection optical system according to claim 1, wherein:
the lens system is configured to produce a distortion which cancels a distortion produced by the convex mirror.

6. An image display apparatus comprising:
the projection optical system according to claim 1; and a screen, onto which a light flux emitted from the projection optical system is projected.

7. A projection optical system for enlarging and projecting a light flux from an image display panel modulating an irradiation light, onto a screen in an oblique direction, the projection optical system comprising:
a lens system including a plurality of lenses, the lens system refracting the light flux from the image display panel; and
a single convex mirror reflecting the light flux from the lens system, the lens system and the convex mirror being arranged in an order from the image display panel;
wherein:
the lens system emits the light flux in a state of convergence, and
the light flux in a state of convergence once converges in an optical path after an emission from the lens system to an incidence on the convex mirror, and then the light flux in a state of divergence enters the convex mirror, wherein:
the lens system includes, in an order from the image display panel, a first lens group having a positive power, a lens-system-stop, and a second lens group having a positive power, and
the lens system is configured so that a position of a converging point of a light flux after the emission from the lens system to the incidence on the convex mirror and a position of the lens-system-stop are in a substantially conjugate relationship.

8. The projection optical system according to claim 7, wherein:
the lens system is configured so that an intermediate image of the image display panel by the first lens group is formed between the lens-system-stop and the second lens group, and the lens system is telecentric on a side of the image display panel.

9. The projection optical system according to claim 8, wherein:
the lens system includes a third lens group between the lens-system-stop and the intermediate image, and
the third lens group includes, in an order from the lens-system-stop, at least one negative power lens, at least one positive power lens, and at least one another negative power lens.

10. The projection optical system according to claim 9, wherein:
a lens included in the second lens group or a lens included in the third lens group includes at least one lens, the at least one lens having a part where no modulated light flux passes.

11. The projection optical system according to claim 7, wherein:
an image formation magnification of the first lens group forming the intermediate image is an enlarging magnification.

12. An image display apparatus comprising:
the projection optical system according to claim 7;
a screen, onto which a light flux emitted from the projection optical system is projected; and
a housing including the screen on a front surface and the projection optical system inside,
wherein the plane mirror of the projection optical system is disposed below the screen and below a light flux travelling from the convex mirror to the screen.

13. The projection optical system according to claim 7, further comprising a stop disposed at the position of the converging point.

14. A projection optical system for enlarging and projecting a light flux from an image display panel modulating an irradiation light, onto a screen in an oblique direction, the projection optical system comprising:
a lens system including a plurality of lenses, the lens system refracting the light flux from the image display panel; and
a single convex mirror reflecting the light flux from the lens system, the lens system and the convex mirror being arranged in an order from the image display panel;
wherein:
the lens system emits the light flux in a state of convergence, and
the light flux in a state of convergence once converges in an optical path after an emission from the lens system to an incidence on the convex mirror, and then the light flux in a state of divergence enters the convex mirror, wherein:
the lens system includes, in an order from the image display panel, a lens-system-stop, a first lens group having a positive power, and a second lens group having a positive power, and
the lens system is configured so that a position of a converging point of a light flux after the emission from the lens system to the incidence on the convex mirror and a position of the lens-system-stop are in a substantially conjugate relationship.

15. The projection optical system according to claim 14, wherein:
the lens system is configured so that an intermediate image of the image display panel by the first lens group is formed between the first lens group and the second lens group, and the lens system is non-telecentric on a side of the image display panel.

16. An image display apparatus comprising:
the projection optical system according to claim 14;
a screen, onto which a light flux emitted from the projection optical system is projected; and
a housing including the screen on a front surface and the projection optical system inside,
wherein the plane mirror of the projection optical system is disposed below the screen and below a light flux travelling from the convex mirror to the screen.

17. The projection optical system according to claim 14, further comprising a stop disposed at the position of the converging point.

* * * * *